US010702975B2

(12) United States Patent
Pearce et al.

(10) Patent No.: US 10,702,975 B2
(45) Date of Patent: Jul. 7, 2020

(54) DRILLING TOOLS HAVING MATRICES WITH CARBIDE-FORMING ALLOYS, AND METHODS OF MAKING AND USING SAME

(71) Applicant: LONGYEAR TM, INC., Salt Lake City, UT (US)

(72) Inventors: Cody A. Pearce, Midvale, UT (US); Michael D. Rupp, Murray, UT (US); Christian M. Lambert, Draper, UT (US)

(73) Assignee: LONGYEAR TM, INC., Salt Lake City, UT (US)

( * ) Notice: Subject to any disclaimer, the term of this patent is extended or adjusted under 35 U.S.C. 154(b) by 668 days.

(21) Appl. No.: 14/993,550

(22) Filed: Jan. 12, 2016

(65) Prior Publication Data
US 2016/0201398 A1 Jul. 14, 2016

Related U.S. Application Data

(60) Provisional application No. 62/102,221, filed on Jan. 12, 2015, provisional application No. 62/102,240, (Continued)

(51) Int. Cl.
*B24D 3/06* (2006.01)
*E21B 10/48* (2006.01)
(Continued)

(52) U.S. Cl.
CPC ............ *B24D 18/0027* (2013.01); *B22F 3/26* (2013.01); *B24D 3/06* (2013.01); *C04B 35/5607* (2013.01);
(Continued)

(58) Field of Classification Search
None
See application file for complete search history.

(56) References Cited

U.S. PATENT DOCUMENTS

| 367,956 A | 8/1887 | Brewer |
| 1,041,568 A | 10/1912 | Bade |

(Continued)

FOREIGN PATENT DOCUMENTS

| AU | 2010298426 | 9/2010 |
| AU | 2010298426 A1 | 5/2012 |

(Continued)

OTHER PUBLICATIONS

U.S. Appl. No. 62/115,930, filed Feb. 13, 2015, Cody A. Pearce (Longyear TM, Inc.).
(Continued)

*Primary Examiner* — James G Sayre
*Assistant Examiner* — Douglas S Wood
(74) *Attorney, Agent, or Firm* — Ballard Spahr LLP

(57) ABSTRACT

Drilling tools, such as drill bits, having a shank, a crown, and a plurality of abrasive cutting elements. In the case of impregnated drilling tools, the abrasive cutting elements are dispersed throughout at least a portion of the crown. In the case of surface-set drilling tools, the abrasive cutting media is secured to and projects from a cutting face of the crown. The matrix of the crown of the drilling tools includes a carbide-forming alloy that forms a direct carbide bond with at least one cutting element of the plurality of abrasive cutting elements.

34 Claims, 10 Drawing Sheets

Related U.S. Application Data filed on Jan. 12, 2015, provisional application No. 62/115,930, filed on Feb. 13, 2015.

(51) Int. Cl.

| | | |
|---|---|---|
| *B24D 18/00* | (2006.01) | |
| *C22C 49/00* | (2006.01) | |
| *B22F 3/26* | (2006.01) | |
| *C22C 29/00* | (2006.01) | |
| *C22C 26/00* | (2006.01) | |
| *C04B 35/56* | (2006.01) | |
| *C22C 1/05* | (2006.01) | |
| *B22F 5/00* | (2006.01) | |

(52) U.S. Cl.
CPC ...... *C04B 35/5611* (2013.01); *C04B 35/5626* (2013.01); *C22C 1/051* (2013.01); *C22C 1/053* (2013.01); *C22C 26/00* (2013.01); *C22C 29/00* (2013.01); *C22C 49/00* (2013.01); *E21B 10/48* (2013.01); *B22F 2005/001* (2013.01); *B22F 2998/10* (2013.01); *B22F 2999/00* (2013.01); *C04B 2235/3217* (2013.01); *C04B 2235/3821* (2013.01); *C04B 2235/3826* (2013.01); *C04B 2235/3847* (2013.01); *C04B 2235/3873* (2013.01); *C04B 2235/40* (2013.01); *C04B 2235/402* (2013.01); *C04B 2235/404* (2013.01); *C04B 2235/405* (2013.01); *C04B 2235/408* (2013.01); *C04B 2235/427* (2013.01); *C04B 2235/428* (2013.01)

(56) References Cited

U.S. PATENT DOCUMENTS

| | | |
|---|---|---|
| 1,572,386 A | 2/1926 | Gates |
| 1,939,991 A | 12/1933 | Krussell |
| 2,147,843 A | 2/1939 | Jamar et al. |
| 2,326,908 A | 8/1943 | Williams |
| 2,371,488 A | 3/1945 | Williams |
| 2,495,400 A | 1/1950 | Williams |
| 2,552,485 A | 5/1951 | Goepfert et al. |
| 2,811,960 A | 11/1957 | Fessel |
| 2,966,949 A | 1/1961 | Wepsala |
| 2,969,122 A | 1/1961 | Steffes |
| 3,215,215 A | 11/1965 | Kellner |
| RE26,669 E | 9/1969 | Henderson |
| 3,495,359 A | 2/1970 | Smith et al. |
| 3,537,538 A | 11/1970 | Generoux |
| 3,972,161 A | 8/1976 | Zoiss |
| 4,098,362 A | 7/1978 | Bonnice |
| 4,128,136 A | 12/1978 | Generoux |
| 4,156,329 A | 5/1979 | Daniels et al. |
| 4,186,628 A | 2/1980 | Bonnice |
| 4,189,015 A | 2/1980 | Acker, III et al. |
| 4,190,126 A | 2/1980 | Kabashima |
| 4,208,154 A | 6/1980 | Gundy |
| 4,211,294 A | 7/1980 | Multakh |
| 4,274,769 A | 6/1981 | Multakh |
| 4,452,325 A | 6/1984 | Radd et al. |
| 4,499,959 A | 2/1985 | Grappendorf et al. |
| 4,505,746 A | 3/1985 | Nakai et al. |
| 4,534,773 A | 8/1985 | Phaal et al. |
| 4,550,790 A | 11/1985 | Link |
| 4,586,574 A | 5/1986 | Grappendorf |
| 4,595,623 A | 6/1986 | Du Pont et al. |
| 4,681,174 A | 7/1987 | Aubakirov et al. |
| 4,698,070 A | 10/1987 | Ohno |
| 4,726,718 A | 2/1988 | Meskin et al. |
| 4,822,757 A | 4/1989 | Sadamori |
| 4,863,490 A | 9/1989 | Buljan et al. |
| 5,025,871 A | 6/1991 | Stewart et al. |
| 5,052,153 A | 10/1991 | Wiand |
| 5,069,584 A | 12/1991 | Obermeier et al. |
| 5,092,910 A | 3/1992 | deKok et al. |
| 5,218,888 A | 6/1993 | Merrill |
| D342,270 S | 12/1993 | Kwang |
| 5,316,416 A | 5/1994 | Kim |
| 5,435,815 A | 7/1995 | Ikegaya et al. |
| 5,451,352 A | 9/1995 | Cook |
| 5,628,376 A | 5/1997 | Kleine |
| 5,644,956 A | 7/1997 | Blackman et al. |
| 5,645,617 A | 7/1997 | Frushour |
| 5,677,372 A | 10/1997 | Yamamoto et al. |
| 5,823,276 A | 10/1998 | Beck, III |
| 5,836,409 A | 11/1998 | Vail, III |
| 5,901,964 A | 5/1999 | Williams et al. |
| 5,932,508 A | 8/1999 | Armstrong et al. |
| 5,996,571 A | 12/1999 | Jedick |
| 6,084,052 A | 7/2000 | Aufdermarsh et al. |
| 6,196,908 B1 | 3/2001 | Adams |
| 6,273,924 B1 | 8/2001 | Krenkel et al. |
| 6,315,066 B1 | 11/2001 | Dennis |
| 6,390,890 B1 | 5/2002 | Molnar |
| 6,394,202 B2 | 5/2002 | Truax et al. |
| 6,399,737 B1 | 6/2002 | Elkovitch |
| 6,413,287 B1 | 7/2002 | Barber, Jr. |
| D466,139 S | 11/2002 | Kim et al. |
| 6,595,844 B1 | 7/2003 | Mizuno et al. |
| 6,607,835 B2 | 8/2003 | Fang et al. |
| 6,742,611 B1 | 6/2004 | Illerhaus et al. |
| 6,997,977 B2 | 2/2006 | Dallas et al. |
| 7,124,753 B2* | 10/2006 | Sung .................. B01J 3/062 125/12 |
| 7,141,086 B2 | 11/2006 | Endoh et al. |
| 7,189,036 B1 | 3/2007 | Watson |
| 7,243,745 B2 | 7/2007 | Skeem et al. |
| 7,628,228 B2 | 12/2009 | Drivdahl et al. |
| 7,641,004 B2 | 1/2010 | Lapointe |
| 7,695,542 B2 | 4/2010 | Drivdahl et al. |
| 7,794,821 B2 | 9/2010 | Sigalas et al. |
| 7,828,090 B2 | 11/2010 | Drivdahl et al. |
| 7,866,419 B2 | 1/2011 | Lockwood |
| 7,972,397 B2 | 7/2011 | Vail |
| 8,191,445 B2 | 6/2012 | Drivdahl et al. |
| 8,517,125 B2* | 8/2013 | Lockwood .......... B24D 18/0027 175/420.2 |
| 8,590,646 B2 | 11/2013 | Lambert et al. |
| 9,267,332 B2* | 2/2016 | Rupp ..................... E21B 10/48 |
| 2002/0011356 A1 | 1/2002 | Hill et al. |
| 2002/0020564 A1 | 2/2002 | Fang et al. |
| 2003/0162648 A1 | 8/2003 | Middlemiss |
| 2004/0231245 A1 | 11/2004 | Yamamoto et al. |
| 2005/0016775 A1 | 1/2005 | Hiranuma et al. |
| 2005/0115743 A1 | 6/2005 | Griffo |
| 2005/0189647 A1 | 9/2005 | Sung |
| 2005/0247491 A1 | 11/2005 | Mirchandani et al. |
| 2006/0243494 A1 | 11/2006 | Koltermann et al. |
| 2007/0051455 A1 | 3/2007 | Franchet et al. |
| 2007/0131456 A1 | 6/2007 | Lapointe |
| 2007/0215390 A1 | 9/2007 | Azar et al. |
| 2007/0246266 A1 | 10/2007 | Larbo |
| 2008/0017421 A1 | 1/2008 | Lockwood |
| 2008/0035389 A1 | 2/2008 | Hall et al. |
| 2008/0066969 A1 | 3/2008 | Paul-Philippe |
| 2008/0128170 A1 | 6/2008 | Drivdahl et al. |
| 2008/0142262 A1 | 6/2008 | Drivdahl et al. |
| 2008/0202821 A1 | 8/2008 | McClain et al. |
| 2008/0209818 A1 | 9/2008 | Belnap et al. |
| 2009/0071724 A1 | 3/2009 | Drivdahl et al. |
| 2009/0120008 A1 | 5/2009 | Lockwood et al. |
| 2009/0283326 A1 | 11/2009 | Oothoudt |
| 2009/0283335 A1 | 11/2009 | Lockwood et al. |
| 2009/0283336 A1 | 11/2009 | Lockwood et al. |
| 2010/0006344 A1 | 1/2010 | Drivdahl et al. |
| 2010/0012385 A1 | 1/2010 | Drivdahl et al. |
| 2010/0133013 A1 | 6/2010 | Hahati et al. |
| 2010/0288564 A1 | 11/2010 | Dovalina, Jr. et al. |
| 2010/0320005 A1 | 12/2010 | Burhan et al. |
| 2011/0067924 A1 | 3/2011 | Lambert et al. |
| 2011/0083907 A1 | 4/2011 | Israelsson et al. |
| 2011/0259648 A1* | 10/2011 | Sani ..................... B22F 7/06 175/428 |

(56) References Cited

U.S. PATENT DOCUMENTS

| | | |
|---|---|---|
| 2011/0303465 A1 | 12/2011 | Rupp et al. |
| 2012/0047814 A1 | 3/2012 | Mukhopadhyay et al. |
| 2013/0098691 A1* | 4/2013 | Pearce .................. B24D 3/06 175/425 |

FOREIGN PATENT DOCUMENTS

| | | |
|---|---|---|
| BR | 1120120023020 | 9/2010 |
| CA | 2775085 | 9/2010 |
| CA | 2775085 A1 | 3/2011 |
| CL | 2012-00099 | 9/2009 |
| CN | 201326379 Y | 10/2009 |
| CN | 101713280 A | 5/2010 |
| CN | 2010080052706.2 | 9/2010 |
| CN | 102459802 A | 5/2012 |
| CN | 102667049 | 8/2015 |
| EP | 0311422 A1 | 4/1989 |
| EP | 0546725 A1 | 6/1993 |
| EP | 10819355.8 | 9/2010 |
| EP | 2462311 A2 | 6/2012 |
| EP | 2475838 A2 | 7/2012 |
| EP | 2480746 A2 | 8/2012 |
| ES | 10819355.8 | 9/2010 |
| FI | 10819355.8 | 9/2010 |
| FR | 10819355.8 | 9/2010 |
| GB | 2270493 A | 3/1994 |
| GB | 2377722 A | 1/2003 |
| JP | H03243735 A | 10/1991 |
| JP | 11012090 | 1/1999 |
| JP | 2004-358580 A | 12/2004 |
| JP | 2006-255822 A | 9/2006 |
| JP | 2007022888 A | 2/2007 |
| NO | 10819355.8 | 9/2010 |
| NZ | 599469 | 9/2010 |
| PE | 338.2012 | 9/2010 |
| RU | 2024727 C1 | 12/1994 |
| SE | 10819355.8 | 9/2010 |
| TR | 10819355.8 | 9/2010 |
| WO | WO-9845091 A2 | 10/1998 |
| WO | WO-0192677 A1 | 12/2001 |
| WO | WO-2006/004494 A1 | 1/2006 |
| WO | WO-2006/076795 A1 | 7/2006 |
| WO | PCT/US2010/049742 | 9/2010 |
| WO | WO-2011017607 A2 | 2/2011 |
| WO | WO-2011017649 A2 | 2/2011 |
| WO | WO-2011031912 A2 | 3/2011 |
| WO | WO-2011042566 A1 | 4/2011 |
| WO | WO-2011046838 A2 | 4/2011 |
| WO | PCT/US16/12967 | 1/2016 |
| ZA | 1991/09211 | 8/1992 |
| ZA | 2012/02920 | 9/2010 |
| ZA | 201202920 B | 6/2013 |

OTHER PUBLICATIONS

U.S. Appl. No. 12/885,284, (U.S. Pat. No. 8,590,646), filed Sep. 17, 2010, (Nov. 26, 2013), Lambert et al. (Longyear, TM, Inc.).
Boart Longyear, Alpha Bit, 2003 (1 page).
Written Opinion dated Mar. 10, 2016 for U.S. Application No. PCT/US16/12967, which was filed on Jan. 12, 2016 (Inventor—Pearce et al; ) (pp. 1-11).
International Search Report dated Mar. 10, 2016 for U.S. Application No. PCT/US16/12967, which was filed on Jan. 12, 2016 (Inventor—Pearce et al; ) (pp. 1-2).
Examination Report dated Sep. 2, 2013 by the Australian Patent Office for AU Application No. 2010298426, which was filed on Sep. 22, 2009 and granted as 2010298426 on Apr. 30, 2015 (Applicant—Longyear TM Inc.) (3 Pages).
Second Examination Report dated Mar. 17, 2014 by the Australian Patent Office for AU Application No. 2010298426, which was filed on Sep. 22, 2009 and granted as 2010298426 on Apr. 30, 2015 (Applicant—Longyear TM Inc.) (3 Pages).
Certificate of Grant dated Apr. 30, 2015 by the Australian Patent Office for AU Application No. 2010298426, which was filed on Sep. 22, 2009 and granted as 2010298426 on Apr. 30, 2015 (Applicant—Longyear TM Inc.) (1 Page).
Office Action dated May 15, 2013 by the Canadian Patent Office for CA Application No. 2,775,085, which was filed on Sep. 22, 2010 and granted as 2,775,085 on Nov. 18, 2014 (Applicant—Longyear TM Inc.) (3 Pages).
Notice of Allowance dated Feb. 13, 2014 by the Canadian Patent Office for CA Application No. 2,775,085, which was filed on Sep. 22, 2010 and granted as 2,775,085 on Nov. 18, 2014 (Applicant—Longyear TM Inc.) (1 Page).
Certificate of Grant dated Nov. 18, 2014 by the Canadian Patent Office for CA Application No. 2,775,085, which was filed on Sep. 22, 2010 and granted as 2,775,085 on Nov. 18, 2014 (Applicant—Longyear TM Inc.) (1 Page).
First Office Action dated Dec. 2, 2013 by the State Intellectual Property Office of the People's Republic of China for CN Application No. 201080052706.2, which was filed on Sep. 22, 2010 and granted as 201080052706.2 on Aug. 5, 2015 (Applicant—Longyear TM Inc.) (Original—18 pages //Translation—30 Pages).
Second Office Action dated Dec. 2, 2013 by the State Intellectual Property Office of the People's Republic of China for CN Application No. 201080052706.2, which was filed on Sep. 22, 2010 and granted as 201080052706.2 on Aug. 5, 2015 (Applicant—Longyear TM Inc.) (Original—17 pages //Translation—7 Pages).
Third Office Action dated Jan. 5, 2015 by the State Intellectual Property Office of the People's Republic of China for CN Application No. 201080052706.2, which was filed on Sep. 22, 2010 and granted as 201080052706.2 on Aug. 5, 2015 (Applicant—Longyear TM Inc.) (Original—3 pages).
Certificate of Grant dated Jan. 5, 2015 by the State Intellectual Property Office of the People's Republic of China for CN Application No. 201080052706.2, which was filed on Sep. 22, 2010 and granted as 201080052706.2 on Aug. 5, 2015 (Applicant—Longyear TM Inc.) (2 pages).
European Search Report dated Feb. 3, 2014 by the European Patent Office for EP Application No. 10819355.8, which was filed on Sep. 22, 2010 and granted as 2480746 on May 13, 2015 (Applicant—Boart Longyear) (3 Pages).
Communication pursuant to Rules 161(2) and 162 EPC dated May 23, 2012 by the European Patent Office for EP Application No. 10819355.8, which was filed on Sep. 22, 2010 and granted as 2480746 on May 13, 2015 (Applicant—Boart Longyear) (2 Pages).
Communication pursuant to Rules 70(2) and 70a(2) EPC dated Feb. 20, 2014 by the European Patent Office for EP Application No. 10819355.8, which was filed on Sep. 22, 2010 and granted as 2480746 on May 13, 2015 (Applicant—Boart Longyear) (1 Page).
Certificate to Grant dated May 13, 2015 by the European Patent Office for EP Application No. 10819355.8, which was filed on Sep. 22, 2010 and granted as 2480746 on May 13, 2015 (Applicant—Boart Longyear) (1 Page).
Examination Report dated Oct. 24, 2012 by the New Zealand Patent Office for NZ Application No. 599469, which was filed on Sep. 22, 2010 (Applicant—Longyear TM Inc.) (2 Pages).
International Search Report dated May 9, 2011 for Application No. PCT/US2010/049742, which was filed on Sep. 22, 2010 and published as WO/2011/037948 on Mar. 31, 2011 (Applicant—Longyear TM Inc.) (3 Pages).
Written Opinion dated May 9, 2011 for Application No. PCT/US2010/049742, which was filed on Sep. 22, 2010 and published as WO/2011/037948 on Mar. 31, 2011 (Applicant—Longyear TM Inc.) (4 Pages).
International Preliminary Report on Patentability dated Mar. 27, 2012 for Application No. PCT/US2010/049742, which was filed on Sep. 22, 2010 and published as WO/2011/037948 on Mar. 31, 2011 (Applicant—Longyear TM Inc.) (5 Pages).
Office Action dated Oct. 26, 2012 by the Peruvian Patent Office for PE Application No. 338.2012, which was filed on Sep. 22, 2010 (Applicant—Longyear TM Inc.) (74 Pages).

(56) References Cited

OTHER PUBLICATIONS

Certificate to Grant dated Jun. 26, 2013 by the South African Patent Office for ZA Application No. 2012/02920, which was filed on Sep. 22, 2010 and granted as 2012/02920 on Jun. 26, 2013(Applicant—Boart Longyear) (1 Page).

Requirement for Restriction/Election dated Mar. 14, 2012 by the U.S. Patent and Trademark Office for U.S. Appl. No. 12/885,284, filed Sep. 17, 2010 now U.S. Pat. No. 8,590,646 on Nov. 26, 2013 (Applicant—Longyear TM Inc.) (6 Pages).

Response to Requirement for Restriction/Election dated Apr. 11, 2012 to the U.S. Patent and Trademark Office for U.S. Appl. No. 12/885,284, filed Sep. 17, 2010 now U.S. Pat. No. 8,590,646 on Nov. 26, 2013 (Applicant—Longyear TM Inc.) (10 Pages).

Non Final Rejection dated Jun. 20, 2012 by the U.S. Patent and Trademark Office for U.S. Appl. No. 12/885,284, filed Sep. 17, 2010 now U.S. Pat. No. 8,590,646 on Nov. 26, 2013 (Applicant—Longyear TM Inc.) (7 Pages).

Response to Non Final Rejection dated Sep. 19, 2012 to the U.S. Patent and Trademark Office for U.S. Appl. No. 12/885,284, filed Sep. 17, 2010 now U.S. Pat. No. 8,590,646 on Nov. 26, 2013 (Applicant—Longyear TM Inc.) (16 Pages).

Final Rejection dated Dec. 20, 2012 by the U.S. Patent and Trademark Office for U.S. Appl. No. 12/885,284, filed Sep. 17, 2010 now U.S. Pat. No. 8,590,646 on Nov. 26, 2013 (Applicant—Longyear TM Inc.) (7 Pages).

Response to Final Rejection dated Mar. 20, 2013 to the U.S. Patent and Trademark Office for U.S. Appl. No. 12/885,284, filed Sep. 17, 2010 now U.S. Pat. No. 8,590,646 on Nov. 26, 2013 (Applicant—Longyear TM Inc.) (7 Pages).

Notice of Allowance dated Apr. 2, 2013 by the U.S. Patent and Trademark Office for U.S. Appl. No. 12/885,284, filed Sep. 17, 2010 now U.S. Pat. No. 8,590,646 on Nov. 26, 2013 (Applicant—Longyear TM Inc.) (6 Pages).

Notice of Allowance dated Jul. 19, 2013 by the U.S. Patent and Trademark Office for U.S. Appl. No. 12/885,284, filed Sep. 17, 2010 now U.S. Pat. No. 8,590,646 on Nov. 26, 2013 (Applicant—Longyear TM Inc.) (6 Pages).

Issue Notification dated Nov. 6, 2013 by the U.S. Patent and Trademark Office for U.S. Appl. No. 12/885,284, filed Sep. 17, 2010 now U.S. Pat. No. 8,590,646 on Nov. 26, 2013 (Applicant—Longyear TM Inc.) (1 Page).

A. Ersoy, M.D. Waller, "Wear characteristics of PDC pin and hybrid core bits in rock drilling," Wear, 188(1-2):150-65 (1995).

European Search Report dated Oct. 18, 2018 by the European Patent Office for EP Application No. 16737699.5, filed on Jan. 12, 2016 and published as EP 3245377 on Nov. 22, 2017 (Applicant—Longyear TM, Inc.) (16 Pages).

Office Action was filed on May 13, 2019 by the SIPO for CN Application No. 2016800074888, which was filed on Jan. 12, 2016 and published as CN 107208459, on Sep. 26, 2017 (Applicant—LongYear TM , Inc.) (Original—8 pages/Translation—12 pages).

* cited by examiner

DRILLING TOOLS HAVING MATRICES WITH CARBIDE-FORMING ALLOYS, AND METHODS OF MAKING AND USING SAME

CROSS-REFERENCE TO RELATED PATENT APPLICATIONS

This application claims priority to and the benefit of the filing date of: U.S. Provisional Patent Application No. 62/102,221, filed Jan. 12, 2015; U.S. Provisional Patent Application No. 62/102,240, filed Jan. 12, 2015; and U.S. Provisional Patent Application No. 62/115,930, filed Feb. 13, 2015. Each of these provisional patent applications is incorporated by reference herein in its entirety.

FIELD

This invention relates to drilling tools for drilling holes in rocks or other formations, and, more particularly, to drill bits for forming a borehole within a formation.

BACKGROUND

In an effort to increase drill bit life, coatings have been applied to the abrasive cutting media (e.g., diamonds) within drill bits. The diamond industry conventionally uses CVD (Chemical Vapor Deposition) or PVD (Physical Vapor Deposition) coatings to increase bond strength between the matrix of the bit and the abrasive cutting media (e.g., diamond). Conventionally, the most common coatings are Titanium, Chrome, Silicon, and Nickel. The CVD coatings are chemically applied, causing the metallic or semi-metallic coating to react with the diamond and create a strong carbide coating. Unfortunately, after the CVD coating is exposed to the atmosphere, it often forms an oxide layer on the surface of the coated diamond, limiting and weakening the chemical bonding with the matrix in the infiltration/sintering process. The PVD coatings do not form a carbide bond with the diamond; they only have a mechanical bond with the diamond, which is much weaker. In addition, similar to the CVD coatings, when the PVD coatings are exposed to the atmosphere, they can form an oxide layer on the surface of the coated diamond before forming a bond to the matrix/diamond, preventing a good bond to the matrix. Further, the CVD and PVD coatings are limited by the size of the diamonds; if the diamond is too small, the coatings cannot be applied effectively.

Multi-layered coatings have also been used. To apply such coatings, a carbide layer is formed using a CVD coating process, and then another layer is added to create a stronger bond between the carbide and the matrix. This creates a stronger coating, but the process is not economical due to the multi-step nature of the process and the expensive materials needed for the additional layers. For example, formation of multi-layered coatings in a CVD coating process conventionally requires multiple heating operations. In addition, the outermost (additional) layer will still form an oxide, thereby limiting the bond strength. Additionally, the smaller the diamonds within the drill bits, the more expensive and/or difficult to apply the multi-layer coatings become.

Thus, there is a need for less costly drill bits that have increased penetration rates and are more resistant to breaking down, thereby decreasing the amount of required rod tripping (due to the longer life of the bits) and increasing the amount of core per shift (due to increased penetration rates).

SUMMARY

Described herein are drilling tools (e.g., drill bits) having a shank, a crown, and a plurality of abrasive cutting elements. The shank can have a first end and an opposing second end. The crown can extend from the second end of the shank. The crown can have a matrix of hard particulate material, a cutting face, and a crown body between the cutting face and the shank. The plurality of abrasive cutting elements can be dispersed throughout at least a portion of the crown body. The matrix of the crown includes a carbide-forming alloy that is configured to form a direct bond with the hard particulate material of the matrix and to form a direct carbide bond with at least one cutting element of the plurality of abrasive cutting elements. Optionally, the carbide-forming alloy can be chromium, titanium, aluminum, or vanadium. It is contemplated that the carbide-forming alloy can be provided as carbide-forming alloy powder or as carbide-forming fibers (e.g., carbide-forming alloy fibers, carbide-forming metal fibers, or semi-metallic carbide-forming fibers). It is further contemplated that the carbide-forming alloys can be provided within a binder. Optionally, the drilling tool can be an impregnated drilling tool (e.g., an impregnated drill bit). Alternatively, the drilling tool can be a surface-set drilling tool (e.g., a surface-set drill bit) in which the plurality of abrasive cutting elements are secured to and project from the cutting face. In exemplary aspects, the drilling tool can be an all-cast drill bit formed by a conventional casting process.

Also described herein are drilling systems that comprise an impregnated drilling tool. Optionally, the drilling systems can have a drill rig, a drill string, and an impregnated drilling tool (e.g., an impregnated drill bit). Alternatively, the drilling systems can have a down-hole motor, a drill string, and an impregnated drilling tool (e.g., impregnated drill bit). The drill string can be configured to be secured to and rotated by the drill rig or down-hole motor, and the drilling tool can be attached to a lower end of the drill string.

Also described herein is a method of drilling using an impregnated drilling tool as disclosed herein. The method can comprise the step of using the impregnated drilling tool (e.g., an impregnated drill bit) as disclosed herein to penetrate an earthen formation. Optionally, the method can comprise securing the impregnated drilling tool to a drill string and then rotating the drill string to cause the impregnated drilling tool to penetrate an earthen formation. Optionally, in some aspects, the method can further comprise the step of securing the drill string to a drill rig or down-hole motor and using the drill rig or down-hole motor to rotate the drill string. In some aspects, the method can further comprise the step of retrieving a core sample using the impregnated drilling tool.

Also described herein are methods of forming the impregnated drilling tools disclosed herein. The method of forming the impregnated drilling tool (e.g., an impregnated drill bit) can include preparing the matrix of the impregnated drilling tool, dispersing the plurality of abrasive cutting media throughout at least a portion of the matrix, infiltrating the matrix with a binder, and securing the shank to the matrix. In these methods, the carbide-forming alloy of the matrix forms a direct bond with the binder and the hard particulate material of the matrix, and the carbide-forming alloy of the matrix forms a direct carbide bond with at least one abrasive cutting element of the plurality of abrasive cutting elements.

Also described herein are drilling systems having a surface-set drilling tool as disclosed herein. Optionally, the drilling systems can have a drill rig, a drill string, and the surface-set drilling tool (e.g., a surface-set drill bit). Alternatively, the drilling systems can have a down-hole motor, a drill string, and the surface-set drilling tool. The drill string can be configured to be secured to and rotated by the drill rig or down-hole motor, and the drilling tool can be attached to a lower end of the drill string.

Also described herein is a method of drilling using the surface-set drilling tools disclosed herein. The method can comprise the step of using a surface-set drilling tool (e.g., a surface-set drill bit) as disclosed herein to penetrate an earthen formation. Optionally, the method can comprise the steps of securing a surface-set drilling tool as disclosed herein to a drill string and then rotating the drill string to cause the surface-set drilling tool to penetrate an earthen formation. Optionally, in some aspects, the method can further comprise the step of securing the drill string to a drill rig or down-hole motor and using the drill rig or down-hole motor to rotate the drill string. In some aspects, the method can further comprise the step of retrieving a core sample using the surface-set drilling tool.

Also described herein are methods of forming the surface-set drilling tools disclosed herein. The method of forming the surface-set drilling tool (e.g., surface-set drill bit) can include preparing the matrix of the surface-set drilling tool, infiltrating the matrix with a binder, positioning the plurality of abrasive cutting elements at the cutting face as disclosed herein, and securing the shank to the matrix. In these methods, the carbide-forming alloy of the matrix forms a direct bond with the binder and the hard particulate material of the matrix and forms a direct carbide bond with at least one abrasive cutting element of the plurality of abrasive cutting elements.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE FIGURES

These and other features of the preferred embodiments of the invention will become more apparent in the detailed description in which reference is made to the appended drawings wherein:

As shown in FIG. 8C, there is a small gap between the matrix and the diamond such that the diamond is only mechanically held in place (rather than being chemically bonded in place).

DETAILED DESCRIPTION

Figure 1:
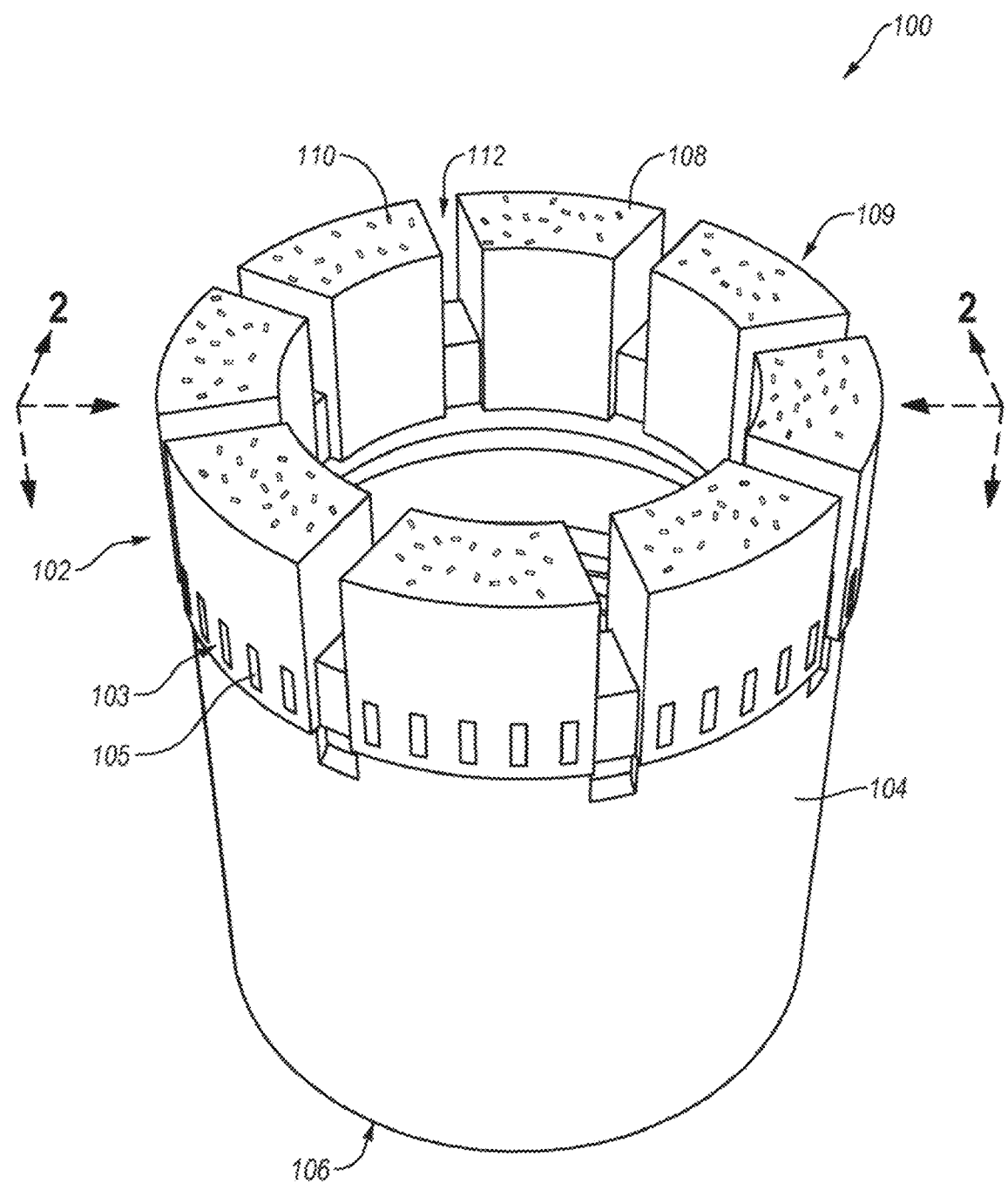
FIG. 1 is a perspective view of an impregnated drill bit as disclosed herein.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" comprise plural referents unless the context clearly dictates otherwise. Thus, for example, reference to "a diamond" can comprise two or more such diamonds and reference to "a bond" can comprise two or more such bonds unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the term "natural diamond" refers to an industrial natural diamond that is configured for use in conventional drill bit manufacturing processes.

As used herein, the terms "optional" or "optionally" mean that the subsequently described event or circumstance can or can not occur, and that the description comprises instances where said event or circumstance occurs and instances where it does not.

The word "or" as used herein means any one member of a particular list and also comprises any combination of members of that list.

As used herein the term "longitudinal" means along the length of the drill string. Additionally, as used herein the terms "upper," "top," and "above" and "lower" and "below" refer to longitudinal positions on the drill string. The terms "upper," "top," and "above" refer to positions nearer the mast and "lower" and "below" refer to positions nearer the drilling tool (e.g., drill bit).

As used herein, the term "infiltration" or "infiltrating" involves melting a binder material and causing the molten binder to penetrate into and fill the spaces or pores of a matrix. Upon cooling, the binder can solidify, binding the particles of the matrix together.

As used herein, the term "sintering" means the removal of at least a portion of the pores between the particles (which can be accompanied by shrinkage) combined with coalescence and bonding between adjacent particles.

Disclosed herein, in exemplary aspects, are drilling tools that comprise a shank, a crown, and a plurality of abrasive cutting elements. The shank can have a first end and an opposing second end. The first end of the shank can be adapted to be secured to a drill string component as further disclosed herein. The crown can extend from the second end of the shank. As further disclosed herein, the crown can comprise: a matrix of hard particulate material and a carbide-forming alloy; a cutting face; and a crown body between the cutting face and the shank. The plurality of abrasive cutting elements can be secured at least partially within the crown body. As further disclosed herein, the carbide-forming alloy forms a direct bond with the hard particulate material of the matrix, and the carbide-forming alloy forms a direct carbide bond with at least one abrasive cutting element of the plurality of abrasive cutting elements.

The drilling tools described herein can be used to cut stone, subterranean mineral deposits, ceramics, asphalt, concrete, and other hard materials. These drilling tools can comprise, for example, core-sampling drill bits, drag-type drill bits, reamers (including reamers with impregnated pads, reamers with broach-style pads, reamers with magnum-style pads, and reamers with premium-style pads as are known in the art), stabilizers, casing or rod shoes, and the like.

Impregnated Drilling Tools

Described herein with reference to FIGS. 1-5 is an impregnated drilling tool for effectively and efficiently drilling through a formation. In exemplary aspects, the impregnated drilling tool can have a shank, a crown, and a plurality of abrasive cutting elements. In these aspects, it is contemplated that the plurality of abrasive cutting elements can comprise relatively large cutting elements and/or small cutting elements as further disclosed herein.

In exemplary aspects, the abrasive cutting elements can be dispersed in an unorganized arrangement throughout at least a portion of the crown. In these aspects, it is contemplated that the plurality of abrasive cutting elements can be dispersed in an unorganized arrangement throughout at least a portion of the crown.

Optionally, it is contemplated that the impregnated drilling tools can comprise relatively large abrasive cutting elements. In use, these relatively large abrasive cutting elements can allow the drilling tool to quickly remove the material of a formation being drilled due to the large depth of cut per revolution associated with the large abrasive cutting elements. Additionally, it is contemplated that the disclosed drilling tools can provide increased longevity by providing additional, sub-surface large abrasive cutting elements that are exposed as the crown of the drill bit wears during drilling. Accordingly, the presence of the relatively large abrasive cutting elements can increase the cutting speed of the drilling tool as well as its durability and longevity.

For ease of description, the Figures and the following text illustrate examples of impregnated, core-sampling drill bits, and methods of forming and using such drill bits. One will appreciate in light of the disclosure herein, however, that the disclosed systems, methods, and apparatus can be used with other impregnated drilling and cutting tools, such as those mentioned hereinabove (e.g., reamers, stabilizers, casings, rod shoes, etc.). In exemplary aspects, it is contemplated that the drilling tool can comprise a full-face drill bit. In other exemplary aspects, it is contemplated that the drilling tool can comprise an all-cast drill bit.

Figure 2:
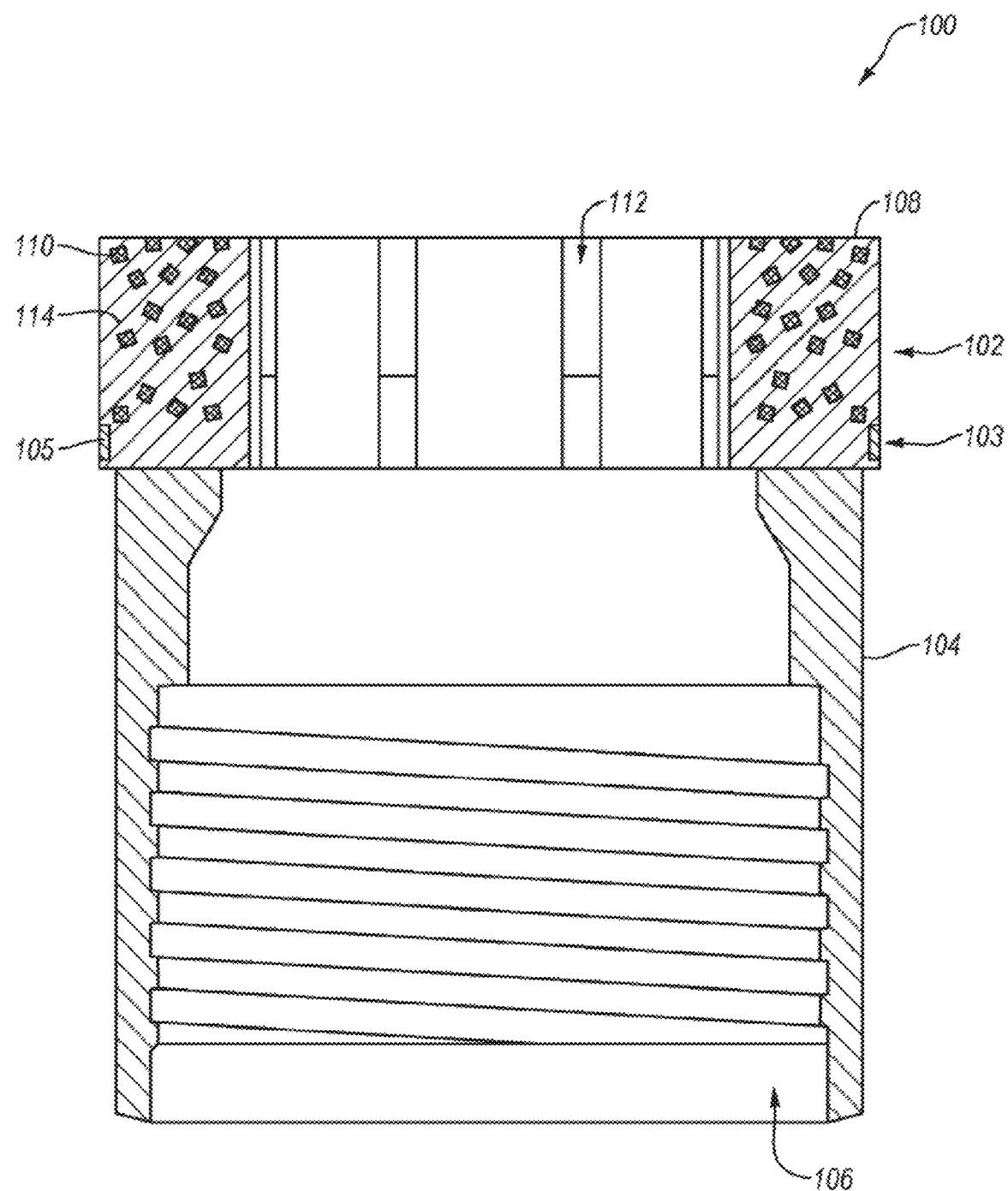
FIG. 2 is a cross-sectional view of the impregnated drill bit of FIG. 1.

Referring now to the Figures, FIGS. 1 and 2 illustrate a perspective view and a cross-sectional view, respectively, of an impregnated drill bit 100. More particularly, FIGS. 1 and 2 illustrate an impregnated, core-sampling drill bit 100 with a plurality of abrasive cutting elements 110, which abrade and cut the material being drilled. As shown in FIG. 1, the drill bit 100 can comprise a cutting portion or crown 102.

A backing layer 103 can secure or connect the crown 102 to a shank or blank 104. As shown in FIGS. 1 and 2, the plurality of abrasive cutting elements 110 of the crown 102 can be dispersed within a matrix 114. As shown by FIG. 2, the backing layer 103, which connects the crown 102 to the shank 104, can be devoid of abrasive cutting elements. In alternative implementations, the backing layer 103 can comprise abrasive cutting elements.

As shown by FIGS. 1 and 2, in some optional aspects, the backing layer 103 can comprise pins 105. The pins 105 can be formed from polycrystalline diamonds, tungsten carbide, or other materials with similar material characteristics. The pins 105 can help maintain the bit gauge and help stabilize the impregnated drill bit 100. In alternative implementations, the backing layer 103 does not comprise pins 105.

Figure 3:
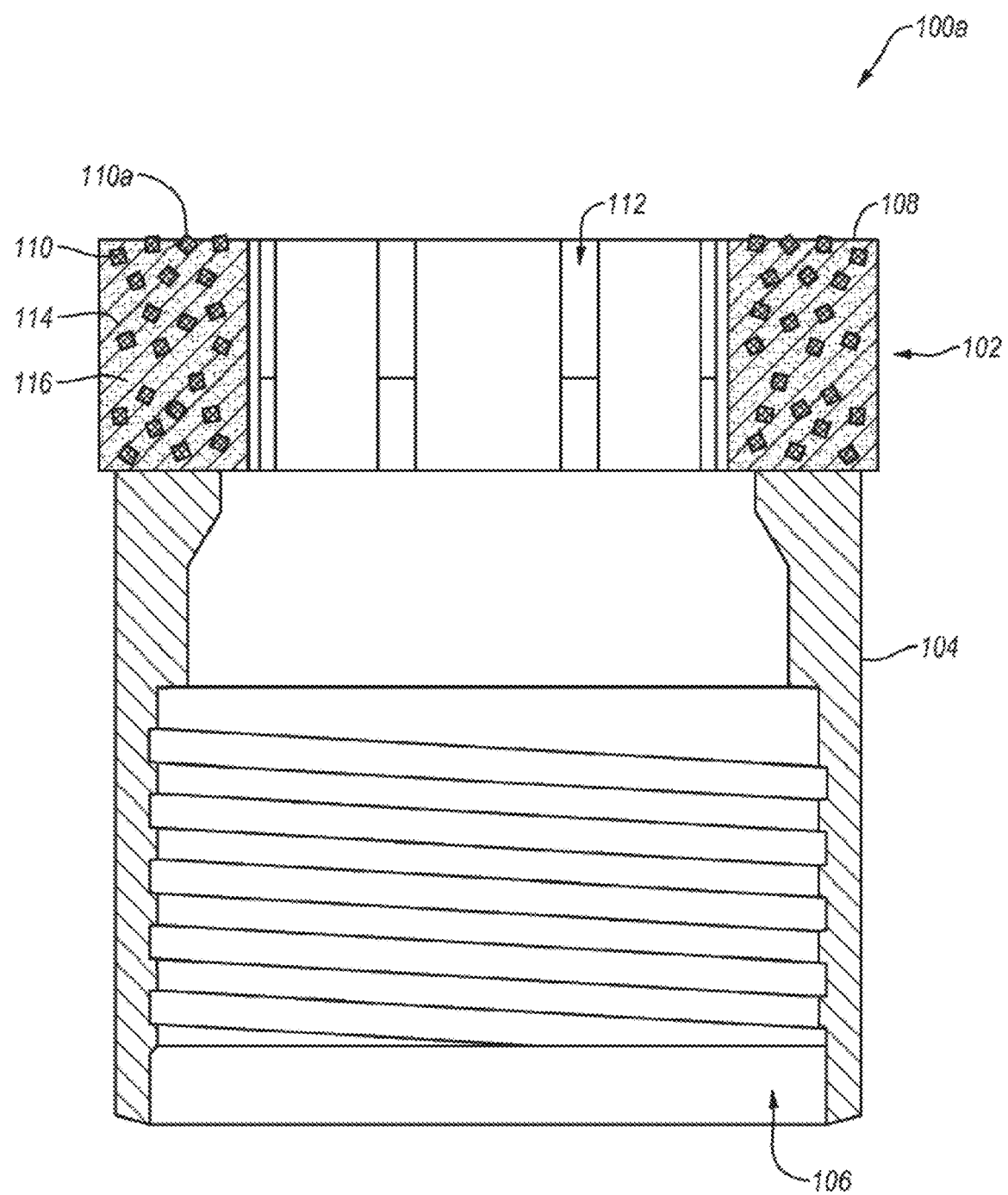
FIG. 3 is a cross-sectional view of an impregnated drill bit comprising a plurality of large abrasive cutting elements and a plurality of small abrasive cutting elements as disclosed herein.

Optionally, the shank 104 can be configured to connect the impregnated drill bit 100 to a component of a drill string. In particular, the upper end of the shank 104 (i.e., the end opposite the end secured to the backing layer 103) can comprise a connector 106 to which a reaming shell or other drill string component can be secured. As shown in FIG. 3, in one or more implementations the connector 106 can comprise a threaded portion having one or more threads.

FIGS. 1 and 2 also illustrate that the drill bit 100 can define an interior space about its central axis for receiving a core sample. Thus, both the crown 102 and the shank 104 can have a generally annular shape defined by an inner surface and outer surface. Accordingly, pieces of the material being drilled can pass through the interior space of the impregnated drill bit 100 and, optionally, up through an attached drill string. The impregnated drill bit 100 can be any size, and therefore, can be used to collect core samples of any size. While the impregnated drill bit 100 can have any diameter and can be used to remove and collect core samples with any desired diameter, the diameter of the impregnated drill bit 100 can range in some implementations from about 1 inch to about 12 inches. Additionally, while the kerf of the impregnated drill bit 100 (i.e., the radius of the outer surface minus the radius of the inner surface) can be any width, it is contemplated that the kerf can optionally range from about ¼ inch to about 6 inches.

The crown 102 can be configured to cut or drill the desired materials during the drilling process. The crown 102 can comprise a cutting face 108 and a crown body extending between the backing layer 103 or shank 104 and the cutting face 108. In particular, the crown 102 of the impregnated drill bit 100 can comprise a plurality of cutting segments 109. The cutting segments 109 can be separated by waterways 112. The waterways 112 can allow drilling fluid or other lubricants to flow across the cutting face 108 to help provide cooling during drilling. The waterways 112 can also allow drilling fluid to flush cuttings and debris from the inner surface to the outer surface of the impregnated drill bit 100.

The crown 104 can have any number of waterways 112 that provides the desired amount of fluid/debris flow and also allows the crown 102 to maintain the structural integrity needed for drilling operations. For example, FIGS. 1 and 2 illustrate that the impregnated drill bit 100 can comprise eight waterways 112. One will appreciate in light of the disclosure herein that the present invention is not so limited. In additional optional aspects, the impregnated drill bit 100 can comprise as few as one waterway or as many as 20 or more waterways, depending on the desired configuration and the formation to be drilled. Additionally, the waterways 112 can be evenly or unevenly spaced around the circumference of the crown 102. For instance, FIG. 1 depicts eight waterways 112 substantially evenly spaced from each other about the circumference of the crown 102. In alternative implementations, however, the waterways 112 can be staggered or otherwise not evenly spaced.

Optionally, the plurality of abrasive cutting elements of the crown 102 can comprise a plurality of relatively large abrasive cutting elements, which can allow the impregnated drill bit 100 to quickly cut soft formation material by removing more material per revolution. As used herein, the term "relatively large" refers to abrasive cutting elements having (i) at least one dimension between about 1.0 millimeter and about 8 millimeters, or more preferably between about 2.5 millimeters and about 5 millimeters, or (ii) having a volume of between about 1 millimeter$^3$ and about 512 millimeters$^3$, or more preferably between about 15.2 millimeters$^3$ and about 125 millimeters$^3$, or (iii) a size between about 5 stones per carat and about 108 stones per carat. The "at least one dimension" of the relatively large abrasive cutting elements can comprise a length, a diameter, a width, a height, or other dimension.

The abrasive cutting elements 110 of the drill bit 100 can have varied shapes or combinations thereof, such as, for example, spheres, cubes, cylinders, irregular shapes, or other shapes. The abrasive cutting elements 110 can include one or more of natural diamond, synthetic diamond, polycrystalline diamond, thermally stable diamond, aluminum oxide, silicon carbide, silicon nitride, tungsten carbide, cubic boron nitride, boron carbide, alumina, seeded or unseeded sol-gel alumina, other suitable materials, or combinations thereof. In one or more implementations, the abrasive cutting elements 110 can comprise homogenous polycrystalline diamond materials, such as thermally stable diamonds that do not have a carbide backing.

FIG. 2 illustrates that the abrasive cutting elements 110 can be dispersed at the cutting face 108 of the crown 102. In addition, FIG. 2 shows that the abrasive cutting elements 110 can be dispersed throughout at least a portion of the crown body (i.e., the portion of the crown 102 between the cutting face 108 and the backing layer 103 or shank 104). In other words, the abrasive cutting elements 110 can be embedded within the crown 102 at the cutting face 108, as well as behind the cutting face 108. Thus, as the abrasive cutting elements 110 and the matrix 114 on the cutting face 108 wear or erode during a drilling process, the embedded abrasive cutting elements 110 are exposed to replenish the cutting face 108. Such a configuration can provide versatility in cutting as abrasive cutting elements 110 continue to be available to cut throughout the life of the impregnated drill bit 100.

The abrasive cutting elements 110 can be dispersed throughout at least a portion of the crown 102. For example, FIG. 2 illustrates that the abrasive cutting elements 110 can be dispersed substantially entirely throughout the crown 102. In alternative aspects, the abrasive cutting elements 110 can be dispersed throughout only a portion of the crown 102. For instance, in some aspects, the abrasive cutting elements 110 can be dispersed only in the portions of the crown 102 proximate the cutting face 108. In yet further aspects, the abrasive cutting elements 110 can be dispersed only in portions of the crown 102 behind the cutting face 108.

As shown in FIG. 2, the abrasive cutting elements 110 can be arranged in the crown 102 in an unorganized arrangement. In additional implementations, the abrasive cutting elements 110 can be randomly dispersed within the crown 102. Thus, in exemplary aspects, the abrasive cutting elements 110 are not arranged in specific alignments relative to each other or the cutting face 108. In alternative aspects, the abrasive cutting elements 110 can be aligned in a particular manner so that the cutting properties of the cutting elements are presented in an advantageous position with respect to the cutting face 108.

In any event, as FIG. 2 illustrates, the abrasive cutting elements 110 can be dispersed substantially homogeneously throughout the crown 102. In alternative aspects, the abrasive cutting elements 110 can be dispersed heterogeneously throughout the crown 102. For example, in some aspects, the concentration of abrasive cutting elements 110 can vary throughout any portion of the crown 102, as desired. In particular, the crown 102 can comprise a gradient of abrasive cutting elements 110. For instance, the portion of the crown 102 that is closest to the cutting face 108 of the impregnated drill bit 100 can contain a first concentration of abrasive cutting elements 110, and the concentration of abrasive cutting elements 110 can gradually decrease or increase towards the backing layer 103. Such an impregnated drill bit 100 can be used to drill a formation that begins with a soft, abrasive, unconsolidated formation, which gradually shifts to a hard, non-consolidated formation. Thus, the dispersal of the abrasive cutting elements 110 in the impregnated drill bit 100 can be customized to the desired formation through which it will be used to drill.

As mentioned previously, the abrasive cutting elements can be dispersed within a matrix 114. The matrix 114 can comprise a hard particulate material, such as, for example, a metal or ceramic. One will appreciate in light of the disclosure herein, that the hard particulate material can comprise a powdered material, such as, for example, a powdered metal or alloy, as well as ceramic compounds. In some exemplary aspects, the hard particulate material can comprise tungsten carbide. As used herein, the term "tungsten carbide" means any material composition that contains chemical compounds of tungsten and carbon, such as, for example, WC, $W_2C$, and combinations of WC and $W_2C$. Thus, tungsten carbide comprises, for example, cast tungsten carbide, sintered tungsten carbide, and macrocrystalline tungsten. In additional or alternative aspects, the hard particulate material can comprise carbide, tungsten, iron, cobalt, and/or molybdenum and carbides, borides, alloys thereof, or any other suitable material.

In exemplary aspects, the matrix 114 can comprise a carbide-forming alloy that is configured to form a direct carbide bond with at least one abrasive cutting element of the plurality of abrasive cutting elements. In these aspects, as further described herein, the carbide-forming alloy can be configured to form a direct carbide bond with a binder and/or the hard particulate matter of a matrix as further disclosed herein. Thus, in contrast to conventional matrices, which bond to an infiltrant (binder) but not to the cutting elements (e.g., synthetic diamonds), the carbide-forming alloys disclosed herein will form a bonds with both the infiltrant (binder) and at least a portion of the cutting elements. As further disclosed herein, the plurality of abrasive cutting elements can comprise at least one cutting element that is configured to form a carbide bond with the carbide-forming alloy. Exemplary cutting elements that are capable of forming a carbide bond with the carbide-forming alloy include natural diamond, synthetic diamond, polycrystalline diamond, thermally stable diamond, and the like. However, in exemplary aspects, the plurality of abrasive cutting media can further comprise at least one abrasive cutting element that is not configured to form a carbide bond with the carbide-forming alloy. Thus, it is not required that every cutting element within the drilling tool form a carbide bond with a carbide-forming alloy.

Figure 8A:
FIGS. 8A and 8B are SEM images of the chemical bonds between a diamond and a drill bit matrix comprising an exemplary carbide-forming alloy and a binder as disclosed herein.
Figure 8B:
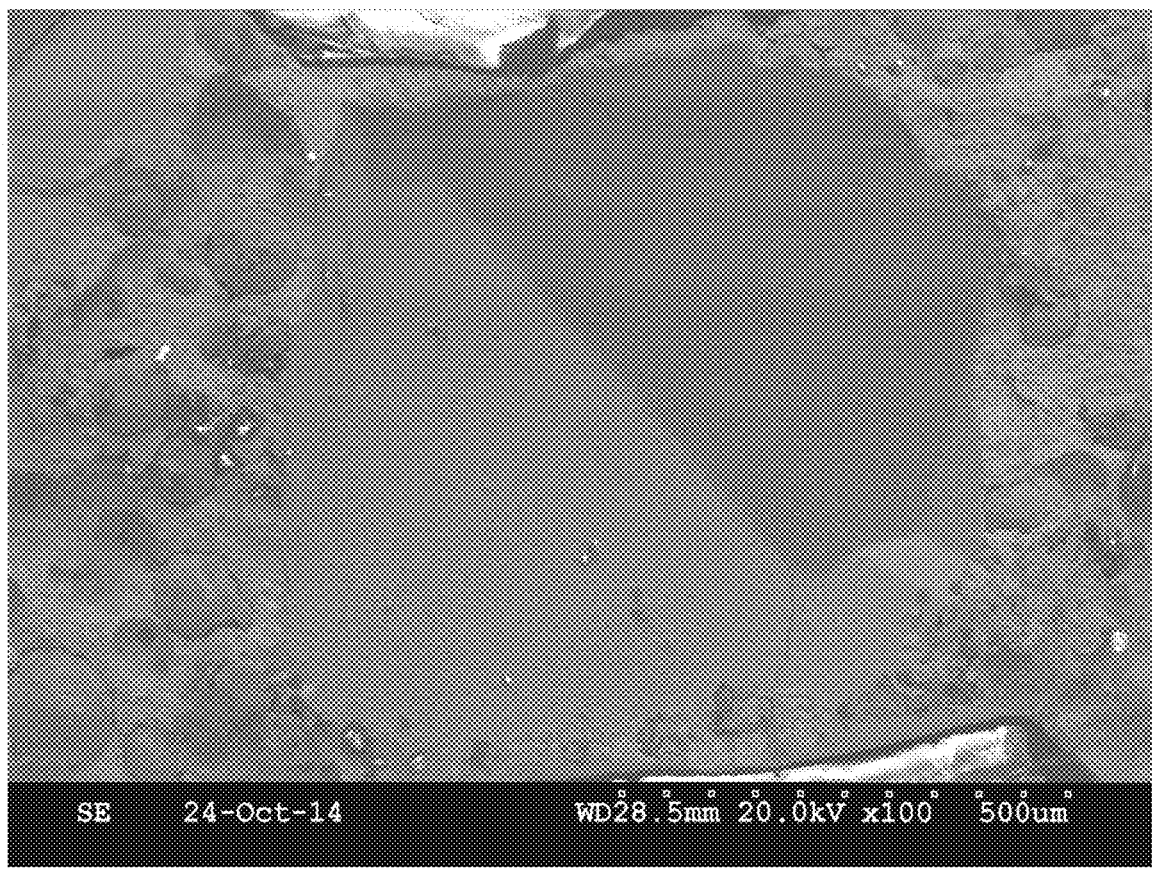
Figure 8C:
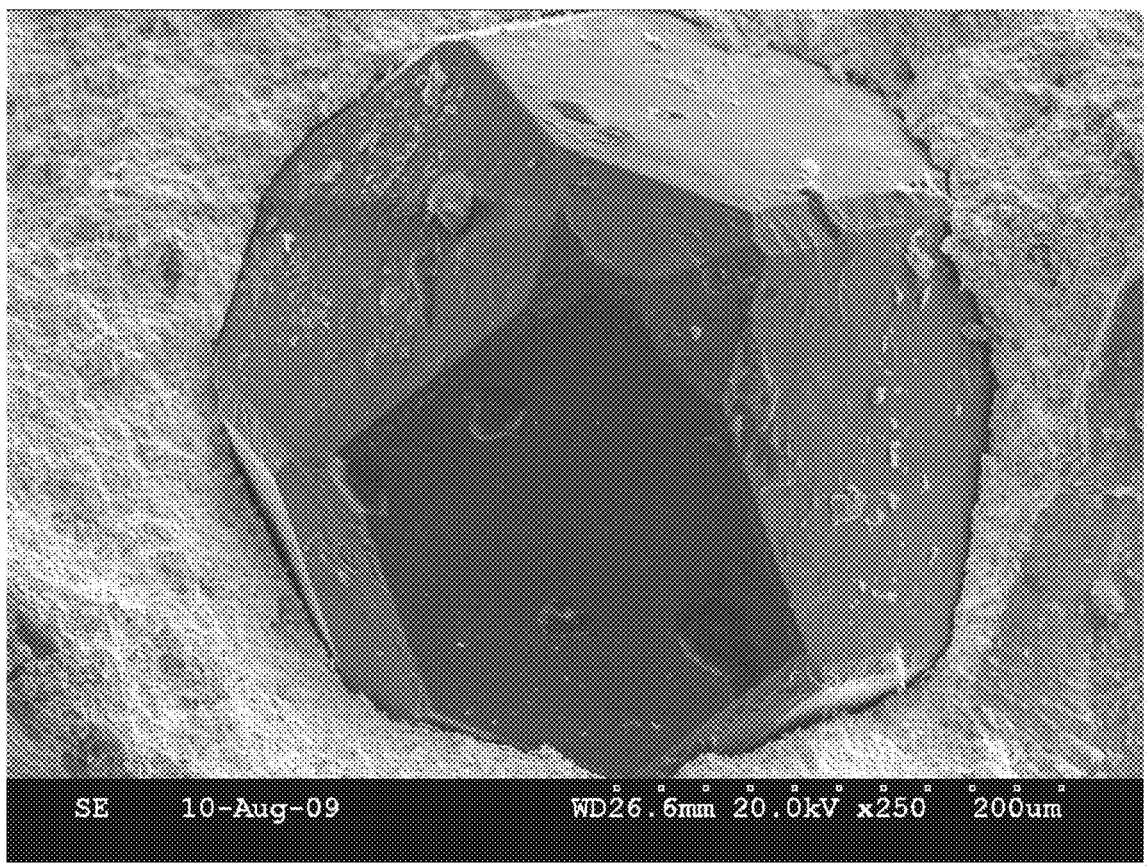
FIG. 8C is an SEM image of a conventional coated diamond.

With reference to FIGS. 8A-8B, it is contemplated that the formation of a bond with both the infiltrant and the cutting elements (including formation of a carbide that bonds to the cutting elements) can create a supporting structure that retains the cutting elements (e.g., synthetic diamond cutting elements) for significantly longer than conventional matrices, such as the matrix depicted in FIG. 8C. More particularly, it is contemplated that the cutting elements can be both chemically and mechanically bonded in place (in contrast to conventional bits, in which cutting elements are merely retained mechanically). The longer each cutting element is retained, the more exposure it will have, and increased exposure can allow for a larger gap between the matrix and the surface of the formation (e.g., rock) being drilled. As the gap between the matrix and the surface of the formation increases, flushing/cooling of the bit improves, thereby increasing the life of the cutting elements (e.g., synthetic diamonds) and the bit. Also, when the cutting elements (e.g., synthetic diamonds) have a sufficient supporting structure, the cutting elements (e.g., synthetic diamonds) can undergo advantageous micro-fracturing, which creates many sharp edges instead of a "wear flat" configuration, thereby increasing the cutting efficiency of the drill bit.

More particularly, the carbide-forming alloy, which can optionally be provided as carbide-forming alloy powder or as carbide-forming alloy fibers, has a high energy potential to form a carbide with the carbon from the cutting elements (e.g., diamond). In other words, the carbide-forming alloy can be configured to convert the carbon from the cutting elements to form a carbide. By providing the carbon from the cutting elements with an excess amount of carbide-forming alloy, an intermediate layer of the alloy can form between the carbide and the binder and the hard particulate material of the matrix (e.g., tungsten powder), thereby bonding them all together. Thus, it is contemplated that the carbide-forming alloy is configured to form a carbide bond with the cutting elements (e.g., diamond) and to also form an intermediate metallic layer that bonds to the binder and the hard particulate material of the matrix (e.g., tungsten). In further exemplary aspects, the plurality of abrasive cutting elements can comprise a plurality of diamond cutting elements, and the carbide-forming alloy can be configured to convert the diamond cutting elements to a carbide to form the direct carbide bonds between the carbide-forming alloy and the diamond cutting elements.

Thus, the process of forming the disclosed drilling tools can bypass or eliminate the initial coating steps of conventional PVD and CVD processes and instead create a chemically bonded coating in a heating/furnacing operation by utilizing matrix powders and binders that will react with the surface of the cutting elements to chemically form a carbide coating. In exemplary aspects, the matrix powders can contain the carbide-forming alloy(s), and the binder can diffuse the carbide-forming alloy(s) throughout the cutting body, thereby improving the reaction of the surface of the cutting elements to form the carbide coating.

It is further contemplated that the disclosed process of forming a direct carbide bond can prevent and/or limit the formation of oxides, which, in conventional drilling tools, can significantly weaken chemical bonds. Thus, the disclosed methods can provide for drilling tools having stronger bonds than conventional drilling tools. More particularly, because the formation of the direct carbide bond between carbide-forming alloy and the cutting elements occurs during in situ heating of the cutting tool (within a furnace) and without the need for multiple heating operations, the disclosed drilling tools are not subject to formation of oxide layers that limit chemical bonding between the matrix powders, binders, and cutting elements.

In exemplary aspects, the drilling tool can be infiltrated with a binder that does not comprise a carbide-forming material. Rather, the carbide-forming materials are provided in the matrix. In these aspects, the abrasive cutting elements can be un-coated, and the carbide-forming alloy of the matrix can form direct carbide bonds with the uncoated abrasive cutting elements. Thus, it is understood that the disclosed binders are not needed to form the direct carbide bond between the carbide-forming alloy and the cutting elements.

In exemplary aspects, the carbide-forming alloy can optionally comprise chromium. In other exemplary aspects, the carbide-forming alloy can optionally comprise titanium. In additional exemplary aspects, the carbide-forming alloy can optionally comprise aluminum. In further exemplary aspects, the carbide-forming alloy can optionally comprise tantalum. In still further exemplary aspects, the carbide-forming alloy can optionally comprise vanadium. In still further exemplary aspects, the carbide-forming alloy can optionally comprise zirconium. However, it is contemplated that the carbide-forming alloy can optionally comprise other materials, such as, for example and without limitation, silicon, niobium, molybdenum, boron, manganese, tungsten, iron, cobalt, and nickel. Optionally, in some aspects, the carbide-forming alloy can consist of a single material, such as, for example and without limitation, titanium, aluminum, tantalum, vanadium, or zirconium. It is understood that the carbide-forming alloys disclosed herein are typically provided as fine powders that can create a risk of an explosion in oxygen ($O_2$) rich environments. Thus, conventionally, manufacturers of drilling tools do not use carbide-forming alloys in the manufacturing process.

Alternatively, in various optional aspects, it is contemplated that the carbide-forming alloys can be provided in the form of a PVD (physical vapor deposition) coating on the large abrasive cutting element (e.g., synthetic diamond). However, in these aspects, it is contemplated that additional safety precautions may be required to prevent exposure to "free" chromium (or other materials) that would be protected from the atmosphere if provided as a carbide-forming alloy powder as disclosed above.

Additionally, while not shown in the figures, the crown 102 can also comprise a binder. The binder can comprise copper, zinc, silver, molybdenum, nickel, cobalt, or mixtures and alloys thereof. The binder can bond to the matrix 114 and the abrasive cutting elements 110, thereby binding the crown 102 together.

As mentioned previously, in exemplary aspects, the plurality of abrasive cutting elements 110 within the impregnated drill bit 100 can comprise relatively large abrasive cutting elements. In these aspects, it is contemplated that the drill bit 100 can further comprise a plurality of small abrasive cutting elements. For example, FIG. 3 illustrates a cross-sectional view of an impregnated drill bit 100*a* that comprises a plurality of small abrasive cutting elements 116 in addition to relatively large abrasive cutting elements 110. It is contemplated that the small abrasive cutting elements can help the drill bit cut in harder formations where the relatively large abrasive cutting elements cannot cut, thereby preventing the bit from polishing.

FIG. 3 shows that the small abrasive cutting elements 116 can be dispersed within a matrix 114 along with the relatively large abrasive cutting elements 110. The small abrasive cutting elements 116 can cut a formation using abrasion. Thus, the small abrasive cutting elements 116 can allow the impregnated drill bit 100*a* to efficiently cut through harder formations.

As used herein, the term "small" refers to abrasive cutting elements having (i) a largest dimension less than about 2 millimeters, or more preferably between about 0.01 millimeters and about 1.0 millimeters, or (ii) having a volume that is less than about 0.75 times the volume of a relatively large abrasive cutting element, or more preferably less than about 0.50 times the volume of a relatively large abrasive cutting media, or (iii) a volume between about 0.001 mm$^3$ and about 8 mm$^3$.

The small abrasive cutting elements 116 can have varied shapes or combinations thereof, such as, for example, spheres, cubes, cylinders, irregular shapes, or other shapes. The "largest dimension" of the small abrasive cutting elements 116 can thus comprise a length, a diameter, a width, a height, or other dimension. The small abrasive cutting elements 116 can comprise one or more of natural diamond, synthetic diamond, polycrystalline diamond, thermally stable diamond, aluminum oxide, silicon carbide, silicon nitride, tungsten carbide, cubic boron nitride, boron carbide, alumina, seeded or unseeded sol-gel alumina, other suitable materials, or combinations thereof. In one aspect, the small abrasive cutting elements 116 can comprise single diamond crystals.

FIG. 3 illustrates that the small abrasive cutting elements 116 can be dispersed at the cutting face 108 of the crown 102. In addition, FIG. 3 shows that the small abrasive cutting elements 116 can be dispersed throughout at least a portion of the crown body (i.e., the portion of the crown 102 between the cutting face 108 and the shank 104). In other words, the small abrasive cutting elements 116 can be embedded within the crown 102 at the cutting face 108, as well as behind the cutting face 108. Thus, as the relatively large abrasive cutting elements 110, the small abrasive cutting elements 116, and the matrix 114 on the cutting face 108 wear or erode during a drilling process, the embedded relatively large abrasive cutting elements 110 and the small abrasive cutting elements 116 can be exposed to replenish the cutting face 108. Such a configuration can provide versatility in cutting as relatively large abrasive cutting elements 110 and small abrasive cutting elements 116 continue to be available to cut throughout the life of the impregnated drill bit 100*a*.

The small abrasive cutting elements 116 can be dispersed throughout at least a portion of the crown 102. For example, FIG. 3 illustrates that the small abrasive cutting elements 116 can be dispersed substantially entirely throughout the crown 102. In alternative aspects, the small abrasive cutting elements 116 can be dispersed throughout only a portion of the crown 102. For instance, in some aspects, the small abrasive cutting elements 116 can be dispersed only in the portions of the crown 102 proximate the cutting face 108. In yet further aspects, the small abrasive cutting elements 116 can be dispersed only in portions of the crown 102 behind the cutting face 108.

As shown in FIG. 3, the small abrasive cutting elements 116 can be arranged in the crown 102 in an unorganized arrangement. In additional implementations, the small abrasive cutting elements 116 can be randomly dispersed within the crown 102. Thus, in exemplary aspects, the small abrasive cutting elements 116 are not arranged in specific alignments relative to each other or the cutting face 108.

In any event, as FIG. 3 illustrates, the small abrasive cutting elements 116 can be dispersed homogeneously throughout the crown 102. In alternative aspects, the small abrasive cutting elements 116 can be dispersed heterogeneously throughout the crown 102. For example, in some aspects, the concentration of the small abrasive cutting elements 116 can vary throughout any desired portion of the crown 102, as desired. In particular, the crown 102 can comprise a gradient of small abrasive cutting elements 116. For instance, the portion of the crown 102 that is closest to the cutting face 108 of the impregnated drill bit 100*a* can contain a first concentration of small abrasive cutting elements 116 and the concentration of small abrasive cutting elements 116 can gradually decrease or increase towards the shank 104. Such an impregnated drill bit 100*a* can be used to drill a formation that begins with a soft, abrasive, unconsolidated formation, which gradually shifts to a hard, non-consolidated formation. Thus, the dispersal of the relatively large abrasive cutting elements 110 and the small abrasive cutting elements 116 in the impregnated drill bit 100*a* can be customized to the desired formation through which it will be drilling.

In exemplary aspects, the abrasive cutting elements 110, 110*a* at the cutting face 108 can extend out of the cutting face 108. In other words, as shown in FIG. 3, the abrasive cutting elements 110, 110*a* can extend from the crown 102 axially away from the cutting face 108. The abrasive cutting elements 110, 110*a* that extend from the crown 102 can help allow for a quick start-up of a new drilling tool 100, 100*a*. In alternative aspects, the cutting face 108 does not comprise abrasive cutting elements 110, 110*a* that extend out of the cutting face 108, such as the impregnated drill bit 100 of FIGS. 1 and 2. In yet further aspects, the cutting face 108 can comprise other features for aiding in the drilling process, such as for example radial grooves.

Figure 4:
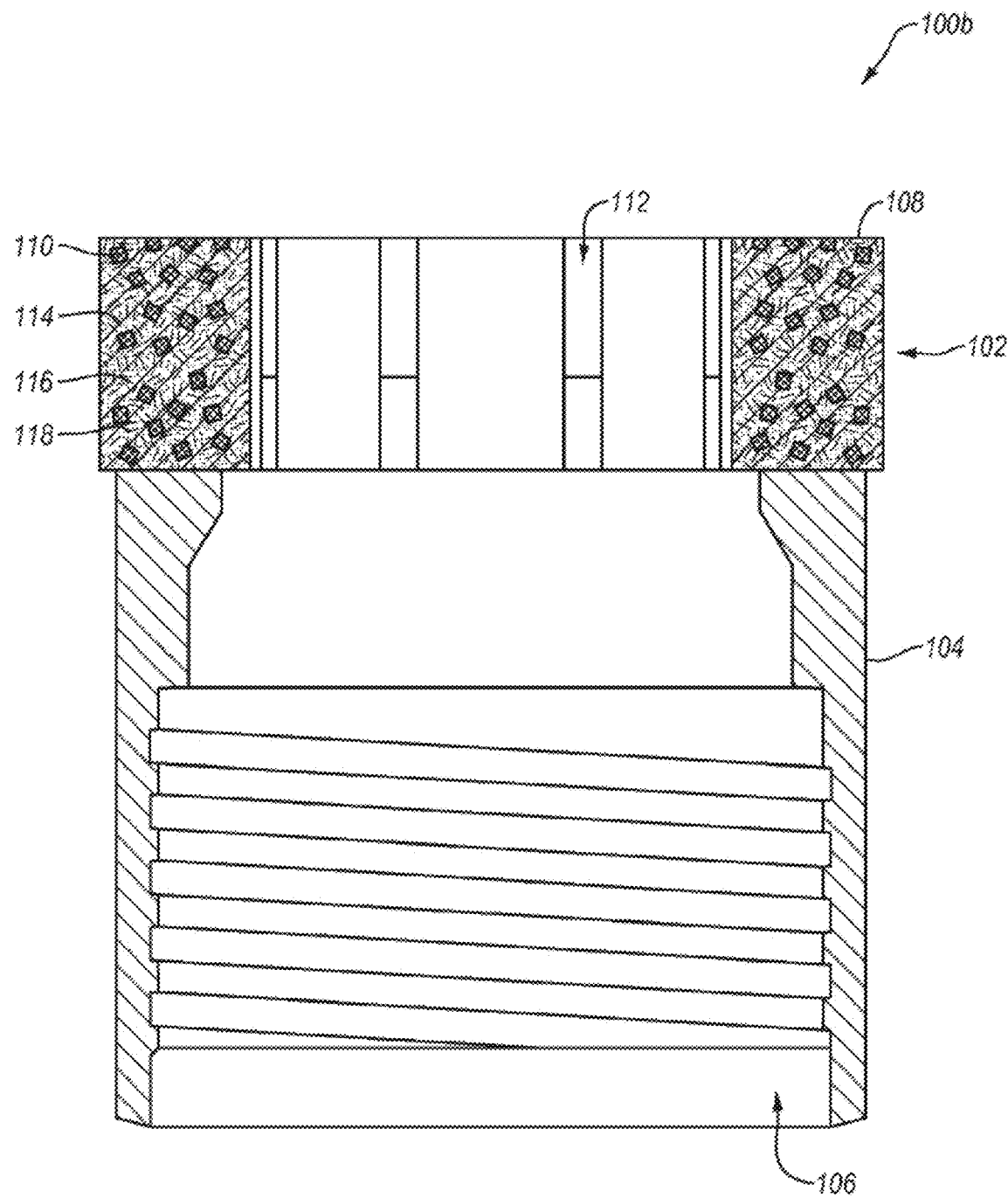
FIG. 4 is a cross-sectional view of an impregnated drill bit comprising a plurality of large abrasive cutting elements, a plurality of small abrasive cutting elements, and a plurality of fibers as disclosed herein.

FIG. 4 illustrates another exemplary impregnated drill bit comprising abrasive cutting elements 110. In particular, FIG. 4 illustrates an impregnated drill bit 100*b* that comprises a crown 102 having relatively large abrasive cutting elements 110, small abrasive cutting elements 116, and a plurality of fibers 118 dispersed within a matrix 114 of hard particulate material. In particular, the crown 102 of one or more implementations of the present invention can comprise fibers, such as the fibers described in U.S. patent application Ser. No. 11/948,185, filed Nov. 30, 2007, entitled "Fiber-Containing Diamond Impregnated Cutting Tools," now U.S. Pat. No. 7,695,542, the content of which is hereby incorporated herein by reference in its entirety. In exemplary aspects, the fibers 118 can help control the rate at which the matrix 118 erodes, and thus, the rate at which the abrasive cutting elements (comprising abrasive cutting elements 110, which can optionally be relatively large abrasive cutting elements, and, optionally, small abrasive cutting elements 116) is exposed.

The fibers 118 can have varied shapes or combinations thereof, such as, for example, ribbon-like, cylindrical, polygonal, elliptical, straight, curved, curly, coiled, bent at angles, etc. The fibers 118 in the crown 102 of the impregnated drill bit 100b can be of any size or combination of sizes, comprising mixtures of different sizes. The fibers 118 can be of any length and have any desired diameter. Optionally, in some aspects, the fibers 118 can be between about 10 microns and about 25,000 microns in length and can have a diameter of between about 1 micron and about 500 microns. In other exemplary aspects, the fibers 118 can be about 150 microns in length and can have a diameter of about 7 microns.

The fibers 118 can comprise one or more of carbon fibers, metal fibers (e.g., fibers made of tungsten, tungsten carbide, iron, molybdenum, cobalt, or combinations thereof), glass fibers, polymeric fibers (e.g., fibers made of Kevlar), ceramic fibers (e.g., fibers made of silicon carbide), coated fibers, and/or the like.

FIG. 4 illustrates that the fibers 118 can be dispersed at the cutting face 108 of the crown 102. In addition, FIG. 4 shows that the fibers 118 can be dispersed throughout at least a portion of the crown body (i.e., the portion of the crown 102 between the cutting face 108 and the shank 104). In other words, the fibers 118 can be embedded within the crown 102 at the cutting face 108, as well as behind the cutting face 108.

The fibers 118 can be dispersed throughout at least a portion of the crown 102. For example, FIG. 4 illustrates that the fibers 118 are dispersed substantially entirely throughout the crown 102. In alternative implementations, the fibers 118 can be dispersed throughout only a portion of the crown 102. For example, in some aspects, the fibers 118 can be dispersed only in the portions of the crown 102 proximate the cutting face 108. In yet further aspects, the fibers 118 can be dispersed only in portions of the crown 102 behind the cutting face 108.

As shown in FIG. 4, the fibers 118 can be arranged in the crown 102 in an unorganized arrangement. In additional aspects, the fibers 118 can be randomly dispersed within the crown 102. Thus, in exemplary aspects, the fibers 118 are not arranged in specific alignments relative to each other or the cutting face 108.

Optionally, as FIG. 4 illustrates, the fibers 118 can be dispersed homogeneously throughout the crown 102. In alternative aspects, the fibers 118 can be dispersed heterogeneously throughout the crown 102. For example, in some aspects, the concentration of the fibers 118 can vary throughout any portion of the crown 102, as desired. In particular, the crown 102 can comprise a gradient of fibers 118. For example, in one exemplary aspect, the portion of the crown 102 that is closest to the cutting face 108 of the impregnated drill bit 100b can contain a first concentration of fibers 118 and the concentration of fibers 118 can gradually decrease or increase towards the shank 104.

Figure 5:
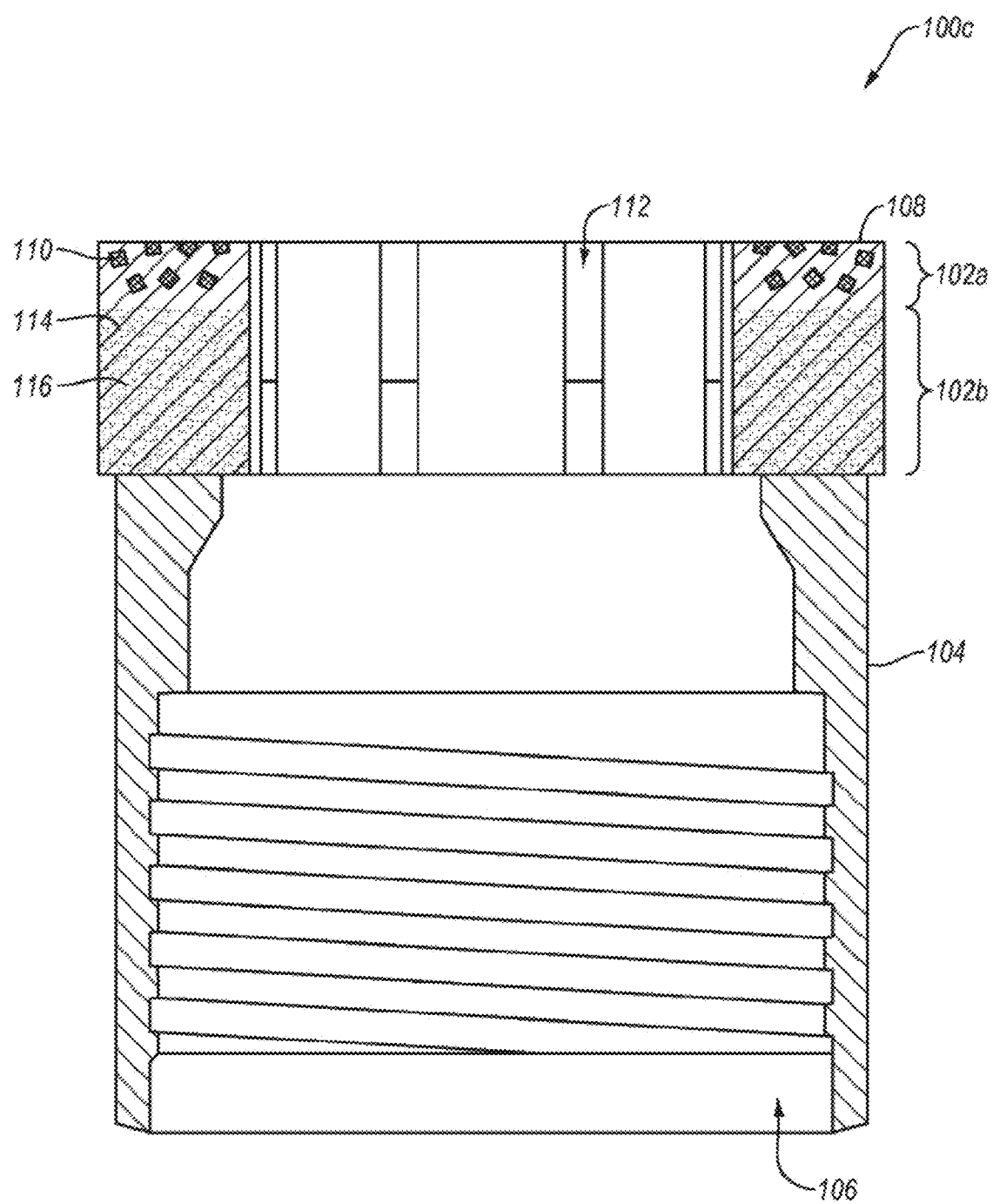
FIG. 5 is a cross-sectional view of an impregnated drill bit comprising a first portion having a plurality of large abrasive cutting elements and a second portion having a plurality of small abrasive cutting elements as disclosed herein.

As alluded to earlier, the dispersal of the abrasive cutting elements 110, such as for example and without limitation a plurality of relatively large abrasive cutting elements and/or small abrasive cutting elements 116, in the disclosed impregnated drill bits can be customized to the desired formation through which it will be drilling. For example, FIG. 5 illustrates a cross-sectional view of an impregnated drill bit 100c with a crown 102 customized for a particular formation. In particular, the portion of the crown 102a that is closest to the cutting face 108 of the impregnated drill bit 100c contains a plurality of abrasive cutting elements 110, which can optionally be a plurality of relatively large abrasive cutting media. Additionally, the portion of the crown 102b that is closest to the shank 104 of the impregnated drill bit 100c can contain a plurality of small abrasive cutting elements 116. Such an impregnated drill bit 100c can be used to drill a formation that begins with a soft, abrasive, unconsolidated formation, which gradually shifts to a hard, non-consolidated formation.

In particular, the abrasive cutting elements 110 of the first portion of the crown 102a can cut the soft material of the formation allowing the impregnated drill bit 100c to penetrate the soft formation relatively quickly. Then the small abrasive cutting elements 116 of the second portion of the crown 102b can abrade the harder material of the formation allowing the impregnated drill bit 100c to penetrate the harder formation relatively quickly.

In alternative aspects, the first portion of the crown 102a can comprise small abrasive cutting elements 116, while the second portion of the crown 102b comprises other abrasive cutting elements 110, which can optionally be relatively large abrasive cutting media. In yet further aspects, one of the first portion 102a and the second portion 102b of the crown can comprise both relatively large abrasive cutting elements 110 and small abrasive cutting elements 116. In still further aspects, the impregnated drill bit 100c can comprise more than two distinct sections 102a, 102b. For example, the impregnated drill bit 100c can comprise three, four, five or more sections each tailored to cut efficiently through different types of formations.

Drilling Systems Comprising Impregnated Drilling Tools

One will appreciate that the impregnated drilling tools as disclosed herein can be used with almost any type of drilling system to perform various drilling operations. For example, FIG. 6, and the corresponding text, illustrate or describe one such drilling system with which the disclosed drilling tools can be used. One will appreciate, however, the drilling system shown and described in FIG. 6 is only one example of a system with which the disclosed drilling tools can be used.

Figure 6:
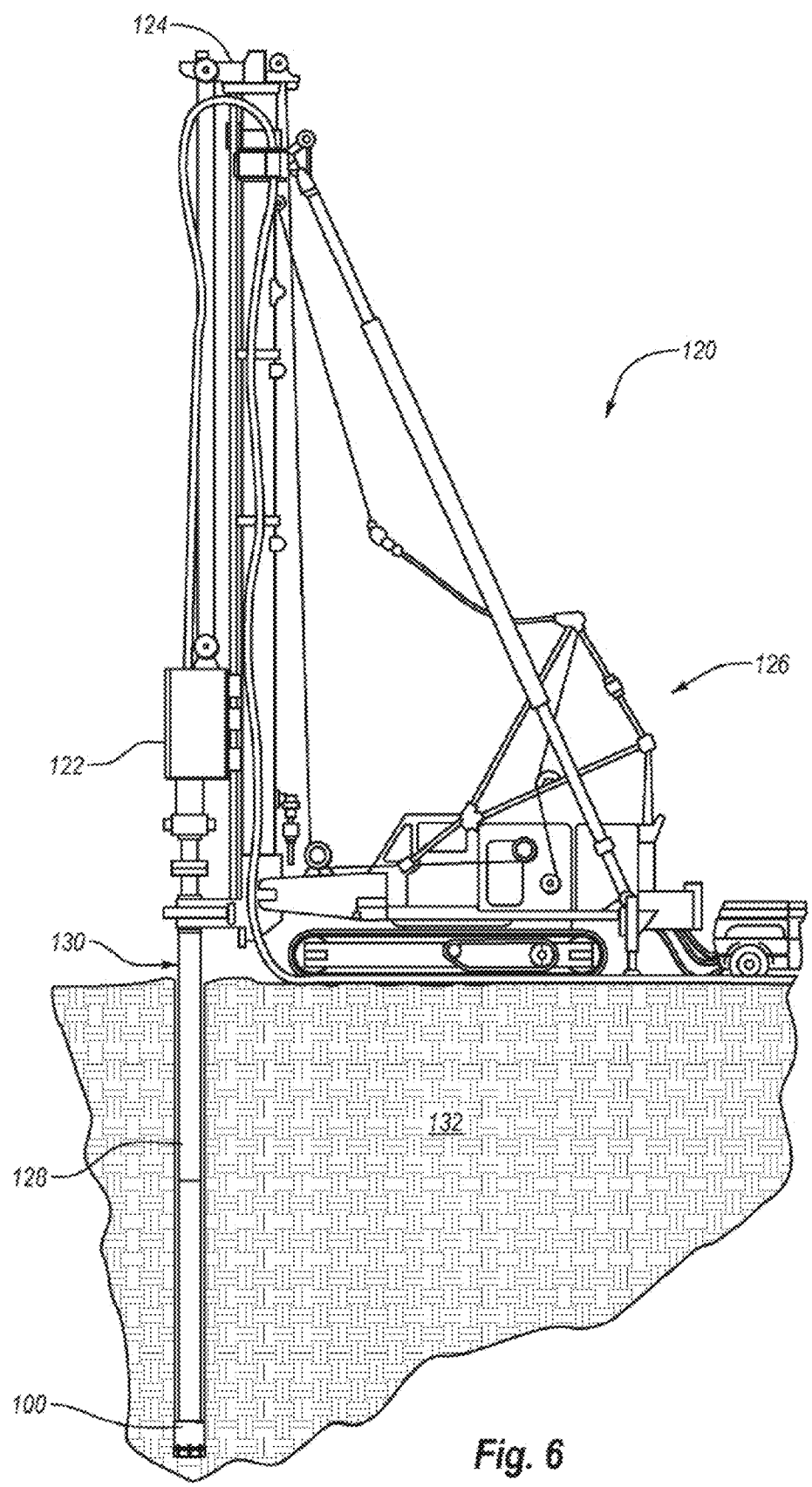
FIG. 6 is a schematic view of a drilling system comprising an impregnated drill bit as disclosed herein.

For example, FIG. 6 illustrates a drilling system 120 that comprises a drill head 122. The drill head 122 can be coupled to a mast 124 that in turn is coupled to a drill rig 126. The drill head 122 can be configured to have one or more tubular members 128 coupled thereto. Tubular members can comprise, without limitation, drill rods, casings, reaming shells, and down-the-hole hammers. For ease of reference, the tubular members 128 will be described hereinafter as drill string components. The drill string component 128 can in turn be coupled to additional drill string components 128 to form a drill or tool string 130. In turn, the drill string 130 can be coupled to an impregnated drill bit 100 as disclosed herein, such as the core-sampling drill bits 100, 100a, 100b, 100c as described hereinabove. As alluded to previously, the impregnated drill bit 100 can be configured to interface with the material 132, or formation, to be drilled.

In at least one example, the drill head 122 illustrated in FIG. 6 can be configured to rotate the drill string 130 during a drilling process. In particular, the drill head 122 can vary the speed at which the drill string 130 rotates. For instance, the rotational rate of the drill head and/or the torque the drill head 122 transmits to the drill string 130 can be selected as desired according to the drilling process.

Alternatively, in exemplary aspects, a down-hole motor can be used in place of or in addition to the drill head 122. Thus, in these aspects, the down-hole motor can be coupled to the mast 124 and can have a drill string 130 (one or more drill string components 128) coupled thereto. In operation, the down-hole motor can be configured to rotate the drill string 130 during a drilling process. In particular, the down-hole motor can vary the speed at which the drill string 130 rotates. For instance, the rotational rate of the down-hole motor and/or the torque the down-hole motor transmits to the drill string 130 can be selected as desired according to the drilling process.

Furthermore, the drilling system 120 can be configured to apply a generally axial (optionally, downward) force to the drill string 130 to urge the impregnated drill bit 100 into the formation 132 during a drilling operation. For example, the drilling system 120 can comprise a chain-drive assembly that is configured to move a sled assembly relative to the mast 124 to apply the generally axial force to the impregnated drill bit 100 as described above.

Thus, one will appreciate in light of the disclosure herein, that the drilling tools of the present invention can be used for any purpose known in the art. For example, an impregnated drill bit 100, 100*a*, 100*b*, 100*c* can be attached to the end of the drill string 130, which is in turn connected to a drilling machine or rig 126. As the drill string 130 and therefore impregnated drill bit 100 are rotated and pushed by the drilling machine 126, the drill bit 100 can grind away the materials in the subterranean formations 132 that are being drilled. The core samples that are drilled away can be withdrawn from the drill string 130. The cutting portion of the drill bit 100 can erode over time because of the grinding action. This process can continue until the cutting portion of a drill bit 100 has been consumed and the drilling string 130 can then be tripped out of the borehole and the drill bit 100 is replaced.

In use, it is contemplated that the abrasive cutting elements can be positioned within the impregnated drill bit 100 to promote formation of "comet tails" behind the abrasive cutting elements during rotation of the bit. It is contemplated that such "comet tails" can be formed by the friction and cuttings produced by contact between the bit and the formation being cut. It is contemplated that the "comet tails" can be configured to support the cutting elements and to maximize clearance between the cutting face of the crown and the formation in three dimensions. It is further contemplated that these clearances can reduce friction and heat while creating more space to efficiently flush cuttings, thereby increasing cooling of the cutting face. In combination, these features can improve overall bit performance and increase bit life. In exemplary aspects, the comet tails can be formed on the first layer of cutting elements (closest to the bit face) of the drill bit 100. In these aspects, it is contemplated that, as the first layer of cutting elements wears down and falls out of the drill bit, the underlying layers of cutting elements are randomly positioned, and the formation of tails cannot be controlled.

Methods of Forming Impregnated Drilling Tools

Implementations of the present invention also comprise methods of forming impregnated drilling tools, such as impregnated drill bits. The following describes at least one method of forming impregnated drilling tools having abrasive cutting elements. Of course, as a preliminary matter, one of ordinary skill in the art will recognize that the methods explained in detail can be modified to install a wide variety of configurations using one or more components of the disclosed drilling system. For example, in one exemplary method, an impregnated drill bit with relatively large abrasive cutting elements can be produced. In exemplary aspects, the impregnated drill bit can be formed using a conventional casting process, such as, for example, a conventional casting process for producing an all-cast bit.

For example, in one aspect, a method of forming an impregnated drill bit can comprise preparing a matrix. Optionally, in one aspect, the step of preparing a matrix can comprise preparing a matrix of hard particulate material. For example, the step of preparing a matrix can comprise preparing a matrix of a powdered material, such as for example tungsten carbide. In additional aspects, the matrix can comprise one or more of the previously described hard particulate materials. In some aspects, the step of preparing a matrix can comprise placing the matrix in a mold. In exemplary aspects, as further disclosed herein, the matrix can further comprise at least one carbide-forming alloy.

The mold can be formed from a material that is capable of withstanding the heat to which the matrix will be subjected during a heating process. In exemplary aspects, the mold can be formed from carbon. It is contemplated that the mold can be shaped to form a drilling tool (such as a drill bit) having desired features. In exemplary aspects, the mold can correspond to a core drill bit.

Additionally, in further aspects, the method can comprise dispersing a plurality of abrasive cutting elements throughout at least a portion of the matrix. Additionally, the method can comprise dispersing the abrasive cutting elements randomly or in an unorganized arrangement throughout the matrix.

In exemplary aspects, the step of dispersing a plurality of abrasive cutting elements can optionally comprise dispersing a plurality of relatively large abrasive cutting elements and/or a plurality of small abrasive cutting elements throughout at least a portion of the matrix. Additionally, the method can comprise dispersing the relatively large and/or small abrasive cutting elements randomly or in an unorganized arrangement throughout the matrix.

In further exemplary aspects, the method can further comprise dispersing a plurality of fibers throughout at least a portion of the matrix. In particular, it is contemplated that the method can comprise dispersing carbon fibers randomly or in an unorganized arrangement throughout the matrix.

In additional aspects, the method can comprise infiltrating the matrix with a binder. In these aspects, the step of infiltrating the matrix with a binder can comprise heating the binder to a molten state and infiltrating the matrix with the molten binder. For example, in some aspects, the binder can be placed proximate the matrix 114 and the matrix 114 and the binder can be heated to a temperature sufficient to bring the binder to a molten state. In these aspects, the molten binder can infiltrate the matrix 114. In exemplary aspects, the step of infiltrating the matrix with a binder can comprise heating the matrix 114 and the binder to a temperature of at least 787° F. In exemplary aspects, it is contemplated that the binder (in powder form) can initially be positioned on top of the matrix powder (prior to infiltration). In these aspects, one or more conventional fluxing agents (optionally, in powder form) can be positioned on top of the binder. During the process of forming the drilling tools disclosed herein, it is contemplated that the one or more fluxing agents can be configured to prevent formation of, or remove, oxides. Non-limiting examples of fluxing agents include borates, fused borax, fluoborates, elemental boron, fluorides, chlorides, boric acid, alkalies, wetting agents, water, conventional solvents (e.g., alcohols), and combinations thereof. It is contemplated that the use of such fluxing agents can improve bonding among the hard particulate material, carbide-forming alloys, binder, and cutting elements of the drilling tool and reduce surface tension and promote the free flow of the binder during the infiltration process.

As further disclosed herein, in exemplary aspects, the carbide-forming alloy of the matrix can form a direct bond with the binder and the hard particulate material of the matrix and form a direct carbide bond with the plurality of abrasive cutting elements (e.g., synthetic diamond) of the matrix. It is further contemplated that the carbide-forming alloy has a high energy potential to form a carbide bond with the carbon from the abrasive cutting elements (e.g., synthetic diamond). In other words, the carbide-forming alloy can be configured to convert the carbon from the cutting elements to form a carbide. The carbon from the abrasive cutting elements can be provided with an excess amount of the carbide-forming alloy, which in turn can form an intermediate layer of the alloy between the carbide and the binder, thereby bonding them all (the carbide-forming alloy, the carbide, and the binder) together. Thus, it is contemplated that the carbide-forming alloy can form a carbide with the abrasive cutting elements and can also form an intermediate metallic layer that bonds to the binder and the hard particulate material of the matrix (e.g., tungsten).

It is further contemplated that the disclosed process of forming a direct carbide bond can prevent and/or limit the formation of oxides, which, in conventional drilling tools, can significantly weaken, or not allow, chemical bonds. Thus, the disclosed methods can provide for drilling tools having stronger bonds than conventional drilling tools. More particularly, because the formation of the direct carbide bond between carbide-forming alloy and the cutting elements occurs during in situ heating of the cutting tool (within a furnace) and without the need for multiple heating operations, the disclosed drilling tools are not subject to formation of oxide layers that limit chemical bonding between the matrix powders, binders, and cutting elements.

In exemplary aspects, the drilling tool can be infiltrated with a binder that does not comprise a carbide-forming material. In these aspects, the abrasive cutting elements can be un-coated, and the carbide-forming alloy of the matrix can form direct carbide bonds with the uncoated abrasive cutting elements. That is, the abrasive cutting elements are initially un-coated, and the carbide-forming alloy and binder cooperate to coat the abrasive cutting elements in situ within a furnace. However, it is understood that the disclosed binders are not needed to form the direct carbide bond between the carbide-forming alloy and the cutting elements. It is contemplated that any coating of the abrasive cutting elements would interfere with the required direct carbide bonding between the abrasive cutting elements and the carbide-forming alloy.

In exemplary aspects, the binder can comprise copper, zinc, silver, molybdenum, nickel, cobalt, tin, iron, aluminum, silicon, manganese, or mixtures and alloys thereof. It is contemplated that the binder can cool, thereby bonding to portions of the matrix and abrasive cutting elements, and thereby binding portions of the matrix and abrasive cutting media together. In some aspects, the time and/or temperature of the infiltration process can be increased to allow the binder to fill-up a greater number and greater amount of the pores of the matrix. It is contemplated that this can both reduce the shrinkage during sintering, and increase the strength of the resulting drilling tool.

Additionally, in further aspects, the method can comprise securing a shank 104 to the matrix 114. For example, it is contemplated that the step of securing a shank to the matrix can comprise placing a shank 104 in contact with the matrix 114. It is further contemplated that a backing layer 103 of additional matrix, binder material, and/or flux (e.g., one or more fluxing agents as disclosed herein) can then be added and placed in contact with the matrix 114 as well as the shank 104 to complete initial preparation of a green drill bit. Once the green drill bit has been formed, it can be placed in a furnace to thereby consolidate the drill bit. Thereafter, the drill bit can be finished through machine processes as desired.

Optionally, before, after, or in tandem with the infiltration of the matrix 114, one or more of the disclosed methods can comprise sintering the matrix 14 to a desired density. As sintering involves densification and removal of porosity within a structure, the structure being sintered can shrink during the sintering process. It is contemplated that a structure can experience linear shrinkage of between 1% and 40% during sintering. As a result, it can be desirable to consider and account for dimensional shrinkage when designing tooling (molds, dies, etc.) or machining features in structures that are less than fully sintered.

Accordingly, the schematics and methods described herein provide a number of unique products that can be effective for drilling through both soft and hard formations. Additionally, such products can have an increased drilling penetration rate due to the large abrasive cutting elements. Furthermore, as the abrasive cutting elements can be dispersed throughout the crown, new abrasive cutting elements can be continually exposed during the drilling life of the impregnated drill bit.

Surface-Set Drilling Tools

Figure 7:
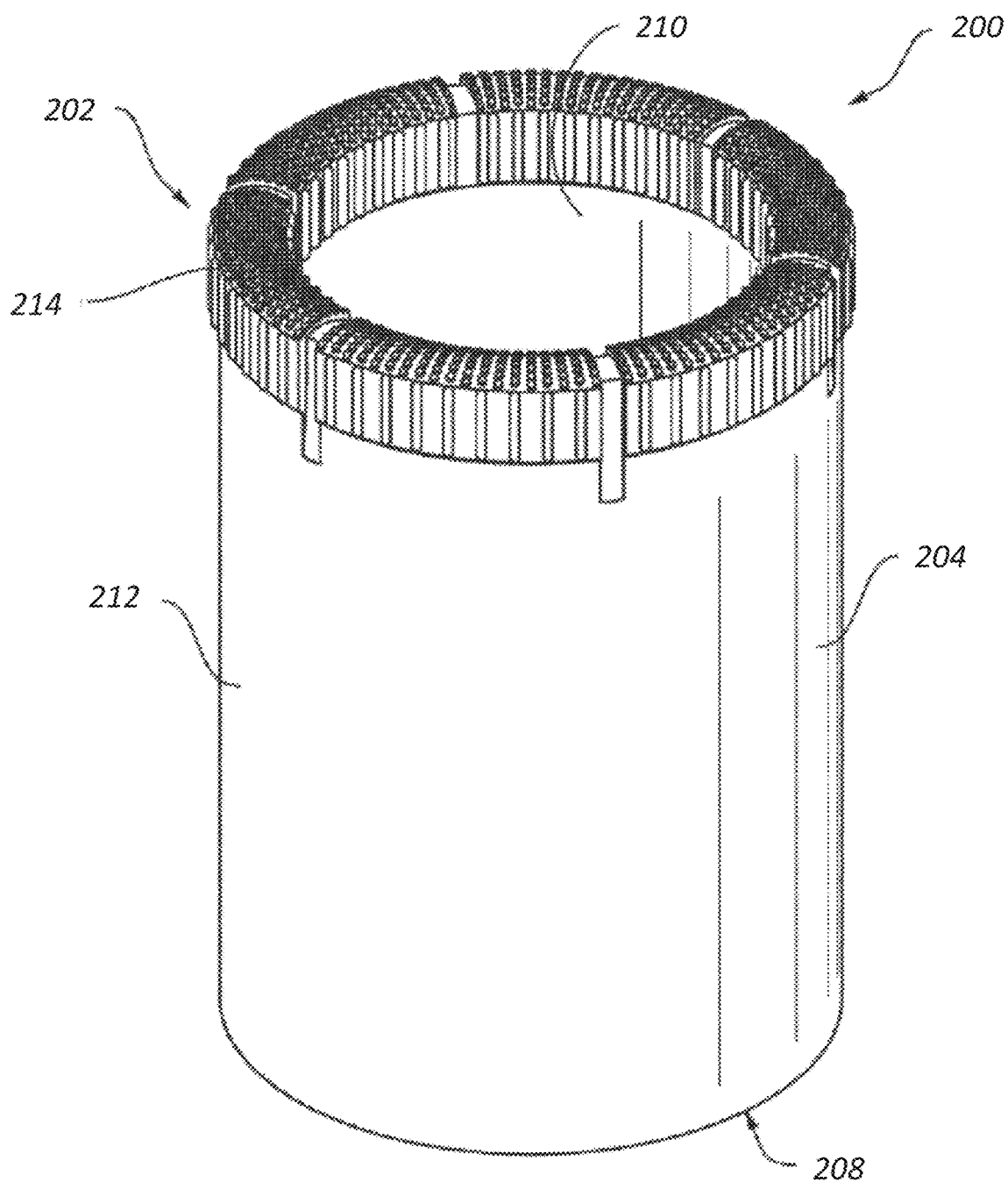
FIG. 7 is an exemplary surface-set coring drill bit as disclosed herein.

Described herein with reference to FIG. 7 is a surface-set drilling tool for effectively and efficiently drilling through a formation. In exemplary aspects, the surface-set drilling tool can have a shank, a crown, and a plurality of abrasive cutting elements. In exemplary aspects, the abrasive cutting elements can be secured at the cutting face of the drilling tool in the manner of conventional surface-set drilling tools.

The surface-set drilling tools described herein can be used to cut stone, subterranean mineral deposits, ceramics, asphalt, concrete, and other soft or hard materials. For ease of description, the Figures and the following text illustrate examples of surface-set, core-sampling drill bits, and methods of forming and using such drill bits. One will appreciate in light of the disclosure herein, however, that the disclosed systems, methods, and apparatus can be used with other surface-set drilling and cutting tools, such as, for example and without limitation, a surface-set reamer or a hybrid surface-set/impregnated reamer. In exemplary aspects, the disclosed surface-set bits can be full-face surface-set bits. In other exemplary aspects, the disclosed surface-set bits can be all-cast surface-set bits.

It is contemplated that the abrasive cutting elements at the cutting face can allow the surface-set drill bits to cut effectively and efficiently through softer formations. Thus, it is contemplated that the disclosed surface-set drill bits can cut through softer formations at relatively high cutting speeds. Optionally, the abrasive cutting elements can comprise synthetic diamonds, which fracture and create new cutting edges during drilling operations. This is in contrast to polycrystalline diamonds, which fracture across grain boundaries.

Referring now to the Figures, FIG. 7 illustrates a perspective view of a surface-set drill bit 200. More particularly, FIG. 7 illustrates a surface-set, core-sampling drill bit 200 with a plurality of abrasive cutting elements 214 secured to the cutting face of the drill bit. As shown in FIG. 7, the drill bit 100a can comprise a cutting portion or crown 202.

The drill bit 200 can comprise a shank portion 204 with a first end 208 that is configured to connect the drill bit 200 to a component of a drill string. Optionally, the first end 208 can define a threaded portion configured for engagement with corresponding threads of a component of a drill string. By way of example and not limitation, the shank portion 208 may be formed from steel, another iron-based alloy, or any other material that exhibits acceptable physical properties. Also, the drill bit 200 can have a generally annular shape defined by an inner surface 210 and an outer surface 212. Thus, the drill bits 200 can define an interior space about its central axis for receiving a core sample. Accordingly, pieces of the material being drilled can pass through the interior space of the drill bit 200 and up through an attached drill string. The drill bit 200 may be any size, and therefore, may be used to collect core samples of any size. While the drill bit 200 may have any diameter and may be used to remove and collect core samples with any desired diameter, the diameter of the drill bit 200 can range in some aspects from about 1 inch to about 12 inches. Similarly, while the kerf of the surface-set drill bit 200 (i.e., the radius of the outer surface minus the radius of the inner surface) can be any width, it is contemplated that the kerf can optionally range from about ¼ inch to about 6 inches.

In one aspect, the annular crown 202 can be formed from a hard particulate material infiltrated with a binder as is known in the art. Furthermore, the crown 202 can comprise a plurality of cutting elements 214 that are secured to and project from the cutting face of the crown. In various aspects, the cutting elements can comprise one or more of natural diamonds, synthetic diamonds, polycrystalline diamond or thermally stable diamond products, aluminum oxide, silicon carbide, silicon nitride, tungsten carbide, cubic boron nitride, alumina, seeded or unseeded sol-gel alumina, other suitable materials, or combinations thereof. The cutting elements can have varied shapes or combinations thereof, such as, for example, spherical, cubical, cylindrical, irregular shapes, or other polyhedral shapes. The cutting elements 214 can optionally comprise a plurality of relatively large cutting elements as defined herein, such as for example and without limitation, relatively large synthetic diamonds. Optionally, the cutting elements 214 can comprise a plurality of relatively large cutting elements and a plurality of small cutting elements as defined herein.

It is contemplated that the disclosed surface-set bits can have any known configuration. In exemplary aspects, the crown 202 can comprise a plurality of cutting segments that are separated by waterways. The waterways can allow drilling fluid or other lubricants to flow across the cutting face to help provide cooling during drilling. The waterways can also allow drilling fluid to flush cuttings and debris from the inner surface to the outer surface of the surface-set drill bit 200.

In exemplary aspects, the crown 202 can be formed from a matrix of hard particulate material, such as for example, a metal. One will appreciate in light of the disclosure herein, that the hard particulate material may comprise a powdered material, such as for example, a powdered metal or alloy, as well as ceramic compounds. According to some implementations of the present invention the hard particulate material can comprise tungsten carbide. As used herein, the term "tungsten carbide" means any material composition that contains chemical compounds of tungsten and carbon, such as, for example, WC, $W_2C$, and combinations of WC and $W_2C$. Thus, tungsten carbide can comprise, for example, cast tungsten carbide, sintered tungsten carbide, and macrocrystalline tungsten. According to additional or alternative implementations of the present invention, the hard particulate material can comprise carbide, tungsten, iron, cobalt, and/or molybdenum and carbides, borides, alloys thereof, or any other suitable material.

The hard particulate material of the crown 202 can be infiltrated with a binder, which can provide the crown with increased wear resistance, thereby increasing the life of the drill bit 200. The binder can bond to the hard particulate material and the abrasive cutting elements to form the crown 202. It is contemplated that the binder can provide the crown 202 with increased wear resistance, while also not degrading any surface set cutting elements.

The binder can comprise copper, zinc, silver, molybdenum, nickel, cobalt, or mixture and alloys thereof. The binder can bond to the matrix and the cutting elements, thereby binding the crown 202 together. In exemplary aspects, the binder can comprise a binder as disclosed in U.S. Patent Publication No. 2013/0098691, entitled "High-Strength, High-Hardness Binders and Drilling Tools Formed Using the Same," which is incorporated herein by reference in its entirety.

As further described above, the cutting elements can be secured at the cutting face of the crown 202 such that a portion of each cutting element projects from the cutting face. Thus, it is contemplated that the cutting elements can be partially embedded within the crown 202 at the cutting face.

In exemplary aspects, the cutting elements can be arranged on the cutting face of the crown 202 in an unorganized arrangement. For example, in these aspects, it is contemplated that the cutting elements can be randomly dispersed at the cutting face of the crown 202. Thus, in exemplary aspects, the cutting elements are not arranged in specific alignments relative to each other or the cutting face. In alternative aspects, the cutting elements can be aligned in a particular manner so that the cutting properties of the cutting elements are presented in an advantageous position with respect to the cutting face.

Optionally, in some aspects, the cutting elements can be dispersed substantially homogeneously at the cutting face of the crown 202. In alternative aspects, the cutting elements can be dispersed heterogeneously at the cutting face of the crown 202.

In exemplary aspects, the matrix of the crown 202 can comprise a carbide-forming alloy that is configured to form a direct carbide bond with at least one abrasive cutting element of the plurality of cutting elements, such as, for example and without limitation, the relatively large cutting elements described herein. In these aspects, as further described herein, the carbide-forming alloy can be configured to form a direct bond with a binder and/or the hard particulate material of a matrix as disclosed herein. Thus, in contrast to conventional matrices, which bond to an infiltrant (binder) but not to the cutting media (e.g., diamonds), the carbide-forming alloys disclosed herein bond to both the infiltrant (binder) and at least a portion of the cutting elements. As further disclosed herein, the plurality of abrasive cutting elements can comprise at least one cutting element (e.g., natural diamond, synthetic diamond, polycrystalline diamond, thermally stable diamond) that is configured to form a carbide bond with the carbide-forming alloy. However, in exemplary aspects, the plurality of abrasive cutting elements can further comprise at least one abrasive cutting element that is not configured to form a carbide bond with the carbide-forming alloy. Thus, it is not required that every cutting element within the drilling tool form a carbide bond with a carbide-forming alloy.

With reference to FIGS. 8A-8B, it is contemplated that the formation of a bond with both the infiltrant and the cutting elements (including formation of a carbide that bonds to the cutting elements) can create a supporting structure that retains the cutting elements (e.g., synthetic diamond) for significantly longer than conventional matrices, such as the matrix depicted in FIG. 8C. More particularly, it is contemplated that the cutting elements can be both chemically and mechanically bonded in place (in contrast to conventional bits, in which cutting elements are merely retained mechanically). The longer the diamond (or other cutting element) is retained, the more exposure it will have, and increased exposure can allow for a larger gap between the matrix and the surface of the formation (e.g., rock) being drilled. As the gap between the matrix and the surface of the formation increases, flushing/cooling of the bit improves, thereby increasing the life of the cutting elements (e.g., diamonds) and the bit. Also, when the cutting elements (e.g., diamonds) have a sufficient supporting structure, the cutting elements (e.g., diamonds) can undergo advantageous micro-fracturing, which creates many sharp edges instead of a "wear flat" configuration, thereby increasing the cutting efficiency of the drill bit.

More particularly, the carbide-forming alloy, which can optionally be provided as carbide-forming alloy powder or as carbide-forming alloy fibers, has a high energy potential to form a carbide with the carbon from the cutting elements (e.g., diamond). In other words, the carbide-forming alloy can be configured to convert the carbon from the cutting elements to form a carbide. By providing the carbon from the cutting elements with an excess amount of carbide-forming alloy, an intermediate layer of the alloy can form between the carbide and the binder and the hard particulate material of the matrix (e.g., tungsten powder), thereby bonding them all together. Thus, it is contemplated that the carbide-forming alloy is configured to form a carbide bond with the cutting elements (e.g., diamond) and to also form an intermediate metallic layer that bonds to the binder and the hard particulate material of the matrix (e.g., tungsten) while being in the temperature/pressure range that does not significantly graphitize the cutting elements (e.g., diamond). In further exemplary aspects, the plurality of abrasive cutting elements can comprise a plurality of diamond cutting elements, and the carbide-forming alloy can be configured to convert the diamond cutting elements to a carbide to form the direct carbide bonds between the carbide-forming alloy and the diamond cutting elements.

It is further contemplated that the disclosed process of forming a direct carbide bond can prevent and/or limit the formation of oxides, which, in conventional drilling tools, can significantly weaken chemical bonds. Thus, the disclosed methods can provide for drilling tools having stronger bonds than conventional drilling tools. More particularly, because the formation of the direct carbide bond between carbide-forming alloy and the cutting elements occurs during in situ heating of the cutting tool (within a furnace) and without the need for multiple heating operations, the disclosed drilling tools are not subject to formation of oxide layers that limit chemical bonding between the matrix powders, binders, and cutting elements.

In exemplary aspects, the drilling tool can be infiltrated with a binder that does not comprise a carbide-forming material. Rather, the carbide-forming materials are provided in the matrix. In these aspects, the abrasive cutting elements can be un-coated, and the carbide-forming alloy of the matrix can form direct carbide bonds with the uncoated abrasive cutting elements. Thus, it is understood that the disclosed binders are not needed to form the direct carbide bond between the carbide-forming alloy and the cutting elements.

In exemplary aspects, the carbide-forming alloy can optionally comprise chromium. In other exemplary aspects, the carbide-forming alloy can optionally comprise titanium. In additional exemplary aspects, the carbide-forming alloy can optionally comprise aluminum. In further exemplary aspects, the carbide-forming alloy can optionally comprise tantalum. In still further exemplary aspects, the carbide-forming alloy can optionally comprise vanadium. In still further exemplary aspects, the carbide-forming alloy can optionally comprise zirconium. However, it is contemplated that the carbide-forming alloy can optionally comprise other materials, such as, for example and without limitation, silicon, niobium, molybdenum, boron, manganese, tungsten, iron, cobalt, and nickel. Optionally, in some aspects, the carbide-forming alloy can consist of a single material, such as, for example and without limitation, titanium, aluminum, tantalum, vanadium, or zirconium. It is understood that the carbide-forming alloys disclosed herein are typically provided as fine powders that can create a risk of an explosion in oxygen ($O_2$) rich environments. Thus, conventionally, manufacturers of drilling tools do not use carbide-forming alloys in the manufacturing process.

Alternatively, in various optional aspects, it is contemplated that the carbide-forming alloys can be provided in the form of a PVD (physical vapor deposition) coating on the diamond (or other abrasive cutting media). However, in these aspects, it is contemplated that additional safety precautions may be required to prevent exposure to "free" chromium (or other materials) that would be protected from the atmosphere if provided as a carbide-forming alloy powder as disclosed above.

FIG. 7 further illustrates that, in exemplary aspects, the cutting elements at the cutting face can extend out of the cutting face. In other words, the cutting elements at the cutting face can extend from the crown 202 axially away from the cutting face. The cutting elements can help allow for a quick start-up of a new drill bit 200.

Drilling Systems with Surface-Set Drilling Tools

One will appreciate that the surface-set drilling tools (e.g., surface-set drill bits) as disclosed herein can be used with almost any type of drilling system to perform various drilling operations. For example, it is contemplated that the surface-set drilling tools can be used with a drilling system as depicted in FIG. 6 (with the surface-set drill bit 200 being used in place of the impregnated drill bit 100). One will appreciate, however, the drilling system shown and described in FIG. 6 is only one example of a system with which the disclosed drilling tools can be used.

An exemplary, non-limiting drilling system can comprise a drill head. The drill head can be coupled to a mast that in turn is coupled to a drill rig. The drill head can be configured to have one or more tubular members coupled thereto. Tubular members can comprise, without limitation, drill rods, casings, reaming shells, and down-the-hole hammers. For ease of reference, the tubular members will be described hereinafter as drill string components. The drill string component can in turn be coupled to additional drill string components to form a drill or tool string. In turn, the drill string can be coupled to a surface-set drill bit 200 as described hereinabove. As alluded to previously, the surface-set drill bit 200 can be configured to interface with the material, or formation, to be drilled.

In at least one example, the drill head can be configured to rotate the drill string during a drilling process. In particular, the drill head can vary the speed at which the drill string rotates. For instance, the rotational rate of the drill head and/or the torque the drill head transmits to the drill string can be selected as desired according to the drilling process.

Alternatively, in exemplary aspects, a down-hole motor can be used in place of or in addition to the drill head. Thus, in these aspects, the down-hole motor can be coupled to the mast and can have a drill string (one or more drill string components) coupled thereto. In operation, the down-hole motor can be configured to rotate the drill string during a drilling process. In particular, the down-hole motor can vary the speed at which the drill string rotates. For instance, the rotational rate of the down-hole motor and/or the torque the down-hole motor transmits to the drill string can be selected as desired according to the drilling process.

Furthermore, the drilling system can be configured to apply a generally longitudinal downward force to the drill string to urge the surface-set drill bit 200 into the formation during a drilling operation. For example, the drilling system can comprise a chain-drive assembly that is configured to move a sled assembly relative to the mast to apply the generally longitudinal force to the surface-set drill bit 200.

Thus, one will appreciate in light of the disclosure herein, that the surface-set drill bits of the present invention can be used for any purpose known in the art. For example, a surface-set drill bit 200 can be attached to the end of the drill string, which is in turn connected to a drilling machine or rig. As the drill string and therefore surface-set drill bit 200 are rotated and pushed by the drilling machine, the drill bit 200 can grind away the materials in the subterranean formations that are being drilled. The core samples that are drilled away can be withdrawn from the drill string. The cutting portion of the drill bit 200 can erode over time because of the grinding action. This process can continue until the abrasive cutting elements 214 have been consumed and the drilling string can then be tripped out of the borehole and the drill bit 200 is replaced.

In use, it is contemplated that the cutting elements can be positioned at the cutting face of the surface-set bit 200 to promote formation of "comet tails" behind the cutting elements during rotation of the bit. It is contemplated that such "comet tails" can be formed by the friction and cuttings produced by contact between the bit and the formation being cut. It is contemplated that the "comet tails" can be configured to support the cutting elements and to maximize clearance between the cutting face of the crown and the formation in three dimensions. It is further contemplated that these clearances can reduce friction and heat while creating more space to efficiently flush cuttings, thereby increasing cooling of the cutting face. In combination, these features can improve overall bit performance and increase bit life.

Methods of Forming Surface-Set Drilling Tools

Implementations of the present invention also comprise methods of forming surface-set drilling tools, such as, for example and without limitation, surface-set drill bits as disclosed herein. The following describes at least one method of forming surface-set drilling tools. Of course, as a preliminary matter, one of ordinary skill in the art will recognize that the methods explained in detail can be modified to install a wide variety of configurations using one or more components of the disclosed drilling system. In exemplary aspects, the surface-set drill bit can be formed using a conventional casting process, such as a conventional casting process for producing an all-cast surface-set drill bit.

For example, in one aspect, a method of forming a surface-set drilling tool (e.g., a surface-set drill bit) can comprise preparing a matrix. Optionally, in one aspect, the step of preparing a matrix can comprise preparing a matrix of hard particulate material. For example, the step of preparing a matrix can comprise preparing a matrix of a powdered material, such as for example tungsten carbide. In additional aspects, the matrix can comprise one or more of the previously described hard particulate materials. In some aspects, the step of preparing a matrix can comprise placing the matrix in a mold. In exemplary aspects, as further disclosed herein, the matrix can further comprise a carbide-forming alloy.

The mold can be formed from a material that is capable of withstanding the heat to which the matrix will be subjected during a heating process. In exemplary aspects, the mold can be formed from carbon. It is contemplated that the mold can be shaped to form a drilling tool (e.g., drill bit) having desired features. In exemplary aspects, the mold can correspond to a core drill bit. In exemplary aspects, the step of preparing the matrix can comprise using the mold to define a cutting face of the surface-set drill bit.

In additional aspects, the method can comprise infiltrating the matrix with a binder. In these aspects, the step of infiltrating the matrix with a binder can comprise heating the binder to a molten state and infiltrating the matrix with the molten binder. For example, in some aspects, the binder can be placed proximate the matrix, and the matrix and the binder can be heated to a temperature sufficient to bring the binder to a molten state. In these aspects, the molten binder can infiltrate the matrix. In exemplary aspects, the step of infiltrating the matrix with a binder can comprise heating the matrix and the binder to a temperature of at least 787° F. In exemplary aspects, it is contemplated that the binder (in powder form) can initially be positioned on top of the matrix powder (prior to infiltration). In these aspects, one or more conventional fluxing agents (optionally, in powder form) can be positioned on top of the binder. During the process of forming the drilling tools disclosed herein, it is contemplated that the one or more fluxing agents can be configured to prevent formation of, or remove, oxides. Non-limiting examples of fluxing agents include borates, fused borax, fluoborates, elemental boron, fluorides, chlorides, boric acid, alkalies, wetting agents, water, conventional solvents (e.g., alcohols), and combinations thereof. It is contemplated that the use of such fluxing agents can improve bonding among the hard particulate material, carbide-forming alloys, binder, and cutting elements of the drilling tool and reduce surface tension and promote the free flow of the binder during the infiltration process.

Additionally, in further aspects, the method can comprise securing the plurality of abrasive cutting elements to the cutting face defined by the matrix. Additionally, the method can comprise dispersing the cutting elements randomly or in an unorganized arrangement at the cutting face of the matrix. In exemplary aspects, each cutting medium can be set within a plot mark defined by a mold in a conventional manner. Optionally, in additional exemplary aspects, it is contemplated that the steps of preparing the matrix, infiltrating the matrix, securing the plurality of abrasive cutting media, and securing the shank can be performed using a casting process.

When the plurality of cutting media are secured to the cutting face, it is contemplated that the cutting elements can be set at the cutting face (e.g., within a plot mark defined by a mold) in any desired orientation.

As further disclosed herein, in exemplary aspects, the carbide-forming alloy of the matrix can form a direct bond with the binder and the hard particulate material of the matrix and form a direct carbide bond with the plurality of abrasive cutting elements (e.g., synthetic diamond) of the matrix. It is further contemplated that the carbide-forming alloy has a high energy potential to form a carbide with the carbon from the cutting elements (e.g., diamond). In other words, the carbide-forming alloy can be configured to convert the carbon from the cutting elements to form a carbide. The carbon from the cutting elements (e.g., diamond) can be provided with an excess amount of the carbide-forming alloy, which in turn can form an intermediate layer of the alloy between the carbide and the binder, thereby bonding them all (the carbide-forming alloy, the carbide, and the binder) together. Thus, it is contemplated that the carbide-forming alloy can form a carbide with the cutting elements (e.g., diamond) and can also form an intermediate metallic layer that bonds to the binder and the hard particulate material of the matrix (e.g., tungsten).

It is further contemplated that the disclosed process of forming a direct carbide bond can prevent and/or limit the formation of oxides, which, in conventional drilling tools, can significantly weaken chemical bonds. Thus, the disclosed methods can provide for drilling tools having stronger bonds than conventional drilling tools. More particularly, because the formation of the direct carbide bond between carbide-forming alloy and the cutting elements occurs during in situ heating of the cutting tool (within a furnace) and without the need for multiple heating operations, the disclosed drilling tools are not subject to formation of oxide layers that limit chemical bonding between the matrix powders, binders, and cutting elements.

In exemplary aspects, the drilling tool can be infiltrated with a binder that does not comprise a carbide-forming material. In these aspects, the abrasive cutting elements can be un-coated, and the carbide-forming alloy can form direct carbide bonds with the uncoated abrasive cutting elements. That is, the abrasive cutting elements are initially un-coated, and the carbide-forming alloy and binder cooperate to coat the abrasive cutting elements in situ within a furnace. However, it is understood that the disclosed binders are not needed to form the direct carbide bond between the carbide-forming alloy and the cutting elements. It is contemplated that any coating of the abrasive cutting elements would interfere with the required direct carbide bonding between the abrasive cutting elements and the carbide-forming alloy.

In exemplary aspects, the binder can comprise copper, zinc, silver, molybdenum, nickel, cobalt, tin, iron, aluminum, silicon, manganese, or mixtures and alloys thereof. It is contemplated that the binder can cool, thereby bonding to the matrix and abrasive cutting media, and thereby binding the matrix and abrasive cutting media together. In some aspects, the time and/or temperature of the infiltration process can be increased to allow the binder to fill-up a greater number and greater amount of the pores of the matrix. It is contemplated that this can both reduce the shrinkage during sintering, and increase the strength of the resulting drilling tool.

Additionally, in further aspects, the method can comprise securing a shank 204 to the matrix of the crown 202. For example, it is contemplated that the step of securing a shank to the matrix can comprise placing a shank 204 in contact with the matrix. It is further contemplated that a backing layer of additional matrix, binder material, and/or flux (e.g., one or more fluxing agents as disclosed herein) can optionally be added and placed in contact with the matrix as well as the shank 204 to complete initial preparation of a green drill bit. Once the green drill bit has been formed, it can be placed in a furnace to thereby consolidate the drill bit. Thereafter, the drill bit can be finished through machine processes as desired.

Optionally, before, after, or in tandem with the infiltration of the matrix, one or more of the disclosed methods can comprise sintering the matrix to a desired density. As sintering involves densification and removal of porosity within a structure, the structure being sintered can shrink during the sintering process. It is contemplated that a structure can experience linear shrinkage of between 1% and 40% during sintering. As a result, it can be desirable to consider and account for dimensional shrinkage when designing tooling (molds, dies, etc.) or machining features in structures that are less than fully sintered.

EXEMPLARY ASPECTS

In view of the described drilling tools, drilling systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A drilling tool, comprising: a shank having a first end and an opposing second end, the first end being adapted to be secured to a drill string component; a crown extending from the second end of the shank, the crown comprising a matrix of hard particulate material and a carbide-forming alloy, a cutting face, and a crown body between the cutting face and the shank; and a plurality of abrasive cutting elements secured at least partially within the crown body, wherein the carbide-forming alloy forms a direct bond with the hard particulate material of the matrix, and wherein the carbide-forming alloy forms a direct carbide bond with at least one abrasive cutting element of the plurality of abrasive cutting elements.

Aspect 2: The drilling tool as recited in aspect 1, wherein the carbide-forming alloy comprises chromium.

Aspect 3: The drilling tool as recited in aspect 1, wherein the carbide-forming alloy comprises titanium.

Aspect 4: The drilling tool as recited in aspect 1, wherein the carbide-forming alloy comprises aluminum.

Aspect 5: The drilling tool as recited in aspect 1, wherein the carbide-forming alloy comprises vanadium.

Aspect 6: The drilling tool as recited in aspect 1, wherein the plurality of abrasive cutting elements comprises a plurality of synthetic diamonds.

Aspect 7: The drilling tool as recited in aspect 1, wherein the plurality of abrasive cutting elements comprises a plurality of thermally stable polycrystalline diamonds.

Aspect 8: The drilling tool as recited in aspect 1, wherein the plurality of abrasive cutting elements comprises natural diamond.

Aspect 9: The drilling tool as recited in aspect 1, wherein the crown has an annular shape, a longitudinal axis, an inner surface, and an outer surface, wherein the inner surface of the crown defines an interior space about the longitudinal axis, and wherein the interior space is configured to receive a core sample.

Aspect 10: The drilling tool as recited in aspect 1, wherein at least one abrasive cutting element of the plurality of abrasive cutting elements extends outwardly from the cutting face.

Aspect 11: The drilling tool as recited in aspect 1, wherein the hard particulate material of the matrix of the crown comprises at least one of tungsten and tungsten carbide.

Aspect 12: The drilling tool as recited in aspect 1, wherein the drilling tool is a drill bit.

Aspect 13: The drilling tool as recited in aspect 12, wherein the drill bit is a full-face drill bit.

Aspect 14: The drilling tool as recited in aspect 12, wherein the drill bit is an all-cast drill bit.

Aspect 15: The drilling tool as recited in aspect 1, wherein the drilling tool is a reamer.

Aspect 16: The drilling tool as recited in aspect 1, wherein the drilling tool is an impregnated drilling tool, and wherein the plurality of abrasive cutting elements are dispersed throughout at least a portion of the crown body.

Aspect 17 The drilling tool as recited in aspect 16, wherein the impregnated drilling tool is an impregnated drill bit.

Aspect 18: The drilling tool as recited in aspect 16, wherein at least a portion of the plurality abrasive cutting elements are dispersed within the crown body proximate the cutting face.

Aspect 19: The drilling tool as recited in aspect 16, further comprising a plurality of fibers dispersed in an unorganized arrangement throughout at least a portion of the crown body.

Aspect 20: The drilling tool as recited in aspect 1, wherein the drilling tool is a surface-set drilling tool, and wherein the plurality of abrasive cutting elements are secured to and project from the cutting face of the crown.

Aspect 21: The drilling tool as recited in aspect 16, wherein the surface-set drilling tool is a surface-set drill bit.

Aspect 22: The drilling tool as recited in aspect 1, wherein the plurality of abrasive cutting elements comprises at least one abrasive cutting element that is not configured to form a carbide bond with the carbide-forming alloy.

Aspect 23: The drilling tool as recited in aspect 1, wherein the drilling tool is infiltrated with a binder, and wherein the binder does not comprise a carbide-forming material.

Aspect 24: The drilling tool as recited in aspect 23, wherein the abrasive cutting elements are not coated, and wherein the carbide-forming alloy forms direct carbide bonds with the uncoated abrasive cutting elements.

Aspect 25: The drilling tool as recited in aspect 1, wherein the plurality of abrasive cutting elements comprise a plurality of diamond cutting elements, and wherein the carbide-forming alloy is configured to convert the diamond cutting elements to a carbide to form the direct carbide bonds between the carbide-forming alloy and the diamond cutting elements.

Aspect 26: A drilling system, comprising: a drill string configured for rotation; and a drilling tool, wherein the drilling tool comprises: a shank having a first end and an opposing second end, the first end being adapted to be secured to a drill string component; a crown extending from the second end of the shank, the crown comprising a matrix of hard particulate material and a carbide-forming alloy, a cutting face, and a crown body between the cutting face and the shank; and a plurality of abrasive cutting elements secured at least partially within the crown body, wherein the carbide-forming alloy forms a direct bond with the hard particulate material of the matrix, and wherein the carbide-forming alloy forms a direct carbide bond with at least one abrasive cutting element of the plurality of abrasive cutting elements.

Aspect 27: The drilling system as recited in aspect 26, further comprising a drill rig, wherein the drill string is adapted to be secured to and rotated by the drill rig.

Aspect 28: The drilling system as recited in aspect 26, further comprising a down-hole motor, wherein the drill string is adapted to be secured to and rotated by the down-hole motor.

Aspect 29: The drilling system as recited in aspect 26, wherein the drilling tool is infiltrated with a binder, and wherein the binder does not comprise a carbide-forming material.

Aspect 30: The drilling system as recited in aspect 29, wherein the abrasive cutting elements are not coated, and wherein the carbide-forming alloy forms direct carbide bonds with the uncoated abrasive cutting elements.

Aspect 31: The drilling system as recited in aspect 26, wherein the plurality of abrasive cutting elements comprise a plurality of diamond cutting elements, and wherein the carbide-forming alloy is configured to convert the diamond cutting elements to a carbide to form the direct carbide bonds between the carbide-forming alloy and the diamond cutting elements.

Aspect 32: A method of drilling, comprising: securing a drilling tool to a drill string, wherein the drilling tool comprises: a shank having a first end and an opposing second end, the first end being adapted to be secured to a drill string component; a crown extending from the second end of the shank, the crown comprising a matrix of hard particulate material and a carbide-forming alloy, a cutting face, and a crown body between the cutting face and the shank; and a plurality of abrasive cutting elements secured at least partially within the crown body, wherein the carbide-forming alloy forms a direct bond with the hard particulate material of the matrix, and wherein the carbide-forming alloy forms a direct carbide bond with at least one abrasive cutting element of the plurality of abrasive cutting elements; and rotating the drill string to cause the drilling tool to penetrate an earthen formation.

Aspect 33: The method as recited in aspect 32, further comprising securing the drill string to a drill rig and using the drill rig to rotate the drill string.

Aspect 34: The method as recited in aspect 32, further comprising securing the drill string to a down-hole motor and using the down-hole motor to rotate the drill string.

Aspect 35: The method as recited in aspect 32, wherein the drilling tool is infiltrated with a binder, and wherein the binder does not comprise a carbide-forming material.

Aspect 36: The method as recited in aspect 35, wherein the abrasive cutting elements are not coated, and wherein the carbide-forming alloy forms direct carbide bonds with the uncoated abrasive cutting elements.

Aspect 37: The method as recited in aspect 32, wherein the plurality of abrasive cutting elements comprise a plurality of diamond cutting elements, and wherein the carbide-forming alloy is configured to convert the diamond cutting elements to a carbide to form the direct carbide bonds between the carbide-forming alloy and the diamond cutting elements.

Aspect 38: A method of forming a drilling tool, comprising: preparing a matrix of the drilling tool, the matrix comprising hard particulate material and a carbide-forming alloy; securing a plurality of abrasive cutting elements within at least a portion of the matrix; infiltrating the matrix with a binder; and securing a shank to the matrix, wherein the carbide-forming alloy of the matrix forms a direct bond with the binder and the hard particulate material of the matrix, and wherein the carbide-forming alloy of the matrix forms a direct carbide bond with at least one abrasive cutting element of the plurality of abrasive cutting elements.

Aspect 39: The method as recited in aspect 38, wherein the drilling tool is formed using a casting process.

Aspect 40: The method as recited in aspect 38, wherein the drilling tool is an impregnated drilling tool, and wherein the plurality of abrasive cutting elements are dispersed throughout at least a portion of the matrix.

Aspect 41: The method as recited in aspect 38, wherein the drilling tool is a surface-set drilling tool, wherein the step of preparing the matrix comprises defining a cutting face of the surface-set drilling tool, and wherein the plurality of abrasive cutting elements are secured to the cutting face such that the abrasive cutting elements project from the cutting face.

Aspect 42: The method as recited in aspect 38, wherein the binder does not comprise a carbide-forming material.

Aspect 43: The method as recited in aspect 42, wherein the abrasive cutting elements are not coated, and wherein the carbide-forming alloy forms direct carbide bonds with the uncoated abrasive cutting elements.

Aspect 44: The method as recited in aspect 38, wherein the plurality of abrasive cutting elements comprise a plurality of diamond cutting elements, and wherein the carbide-forming alloy converts the diamond cutting elements to a carbide to permit formation of the direct carbide bonds between the carbide-forming alloy and the diamond cutting elements.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be comprised within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A diamond-impregnated drilling tool, comprising:
   a shank having a first end and an opposing second end, the first end being adapted to be secured to a drill string component;
   a crown extending from the second end of the shank, the crown comprising a matrix of hard particulate material and a carbide-forming alloy, a binder, a cutting face, and a crown body between the cutting face and the shank; and
   a plurality of uncoated diamonds dispersed within at least a portion of the matrix of the crown body,
   wherein the carbide-forming alloy of the matrix forms an intermediate metallic layer that directly bonds with the binder and the hard particulate material of the matrix, wherein the carbide-forming alloy of the matrix forms a direct carbide bond with at least one uncoated diamond of the plurality of uncoated diamonds, wherein the drilling tool does not include oxide layers between said at least one uncoated diamond and the carbide-forming alloy of the matrix, and
   wherein the carbide-forming alloy of the matrix is configured to convert portions of said at least one uncoated diamond of the plurality of uncoated diamonds to a carbide to form the direct carbide bond between the carbide-forming alloy of the matrix and said at least one uncoated diamond.

2. The drilling tool as recited in claim 1, wherein the carbide-forming alloy comprises chromium.

3. The drilling tool as recited in claim 1, wherein the carbide-forming alloy comprises titanium.

4. The drilling tool as recited in claim 1, wherein the carbide-forming alloy comprises aluminum.

5. The drilling tool as recited in claim 1, wherein the carbide-forming alloy comprises vanadium.

6. The drilling tool as recited in claim 1, wherein the plurality of diamonds comprises a plurality of synthetic diamonds.

7. The drilling tool as recited in claim 1, wherein the plurality of diamonds comprises a plurality of thermally stable polycrystalline diamonds.

8. The drilling tool as recited in claim 1, wherein the plurality of diamonds comprises natural diamond.

9. The drilling tool as recited in claim 1, wherein the crown has an annular shape, a longitudinal axis, an inner surface, and an outer surface, wherein the inner surface of the crown defines an interior space about the longitudinal axis, and wherein the interior space is configured to receive a core sample.

10. The drilling tool as recited in claim 1, wherein at least one diamond of the plurality of diamonds extends outwardly from the cutting face.

11. The drilling tool as recited in claim 1, wherein the hard particulate material of the matrix of the crown comprises at least one of tungsten and tungsten carbide.

12. The drilling tool as recited in claim 1, wherein the drilling tool is a drill bit.

13. The drilling tool as recited in claim 12, wherein the drill bit is a full-face drill bit.

14. The drilling tool as recited in claim 12, wherein the drill bit is an all-cast drill bit.

15. The drilling tool as recited in claim 1, wherein the drilling tool is a reamer.

16. The drilling tool as recited in claim 1, wherein at least a portion of the diamonds are dispersed within the crown body proximate the cutting face.

17. The drilling tool as recited in claim 1, further comprising a plurality of fibers dispersed in an unorganized arrangement throughout at least a portion of the crown body.

18. The drilling tool as recited in claim 1, wherein the drilling tool is infiltrated with the binder, and wherein the binder does not comprise a carbide-forming material.

19. The drilling tool as recited in claim 1, wherein the carbide-forming alloy comprises molybdenum.

20. A drilling system, comprising:
   a drill string configured for rotation; and
   a diamond-impregnated drilling tool, wherein the drilling tool comprises:
      a shank having a first end and an opposing second end, the first end being adapted to be secured to a drill string component;
      a crown extending from the second end of the shank, the crown comprising a matrix of hard particulate material and a carbide-forming alloy, a binder, a cutting face, and a crown body between the cutting face and the shank; and
      a plurality of uncoated diamonds dispersed within at least a portion of the matrix of the crown body, wherein the carbide-forming alloy of the matrix forms an intermediate metallic layer that directly bonds with the binder and the hard particulate material of the matrix, wherein the carbide-forming alloy of the matrix forms a direct carbide bond with at least one uncoated diamond of the plurality of uncoated diamonds, and wherein the drilling tool does not include oxide layers between said at least one uncoated diamond and the carbide-forming alloy of the matrix, and wherein the carbide-forming alloy is configured to convert portions of the said at least one uncoated diamond of the plurality of uncoated diamonds to a carbide to form the direct carbide bond between the carbide-forming alloy of the matrix and said at least one uncoated diamond.

21. The drilling system as recited in claim 20, further comprising a drill rig, wherein the drill string is adapted to be secured to and rotated by the drill rig.

22. The drilling system as recited in claim 20, further comprising a down-hole motor, wherein the drill string is adapted to be secured to and rotated by the down-hole motor.

23. The drilling system as recited in claim 20, wherein the drilling tool is infiltrated with the binder, and wherein the binder does not comprise a carbide-forming material.

24. The drilling system as recited in claim 20, wherein the carbide-forming alloy comprises molybdenum.

25. A method of drilling, comprising:
securing a diamond-impregnated drilling tool to a drill string, wherein the drilling tool comprises:
a shank having a first end and an opposing second end, the first end being adapted to be secured to a drill string component;
a crown extending from the second end of the shank, the crown comprising a matrix of hard particulate material and a carbide-forming alloy, a binder, a cutting face, and a crown body between the cutting face and the shank; and
a plurality of uncoated diamonds dispersed within at least a portion of the matrix of the crown body,
wherein the carbide-forming alloy of the matrix forms an intermediate metallic layer that directly bonds with the binder and the hard particulate material of the matrix, wherein the carbide-forming alloy of the matrix forms a direct carbide bond with at least one uncoated diamond of the plurality of uncoated diamonds, wherein the drilling tool does not include oxide layers between said at least one uncoated diamond and the carbide-forming alloy of the matrix, and
wherein the carbide-forming alloy of the matrix is configured to convert portions of said at least one uncoated diamond of the plurality of uncoated diamonds to a carbide to form the direct carbide bond between the carbide-forming alloy of the matrix and said at least one uncoated diamond; and
rotating the drill string to cause the drilling tool to penetrate an earthen formation.

26. The method as recited in claim 25, further comprising securing the drill string to a drill rig and using the drill rig to rotate the drill string.

27. The method as recited in claim 25, further comprising securing the drill string to a down-hole motor and using the down-hole motor to rotate the drill string.

28. The method as recited in claim 25, wherein the drilling tool is infiltrated with the binder, and wherein the binder does not comprise a carbide-forming material.

29. The method as recited in claim 25, wherein the carbide-forming alloy comprises molybdenum.

30. A method of forming a diamond-impregnated drilling tool, comprising:
preparing a matrix of the drilling tool, the matrix comprising hard particulate material and a carbide-forming alloy;
dispersing a plurality of uncoated diamonds within at least a portion of the matrix;
infiltrating the matrix with a binder;
securing a shank to the matrix; and
heating the shank and the matrix to consolidate the drilling tool,
wherein the carbide-forming alloy of the matrix forms an intermediate metallic layer that directly bonds with the binder and the hard particulate material of the matrix, and wherein the carbide-forming alloy of the matrix forms a direct carbide bond with at least one uncoated diamond of the plurality of uncoated diamonds, and
wherein the carbide-forming alloy converts portions of said at least one uncoated diamond of the plurality of uncoated diamonds to a carbide to form the direct carbide bond between the carbide-forming alloy of the matrix and said at least one uncoated diamond,
wherein the method does not comprise multiple heating operations.

31. The method as recited in claim 30, wherein the drilling tool is formed using a casting process.

32. The method as recited in claim 30, wherein the binder does not comprise a carbide-forming material.

33. The method as recited in claim 30, wherein the carbide-forming alloy of the matrix is provided as a powder, wherein the carbide-forming alloy of the matrix forms direct carbide bonds with said at least one diamond during heating of the drilling tool within a furnace, and wherein the diamonds are uncoated prior to heating of the drilling tool.

34. The method as recited in claim 30, wherein the carbide-forming alloy comprises molybdenum.

* * * * *